(12) United States Patent
Kawasaki et al.

(10) Patent No.: US 8,579,748 B2
(45) Date of Patent: Nov. 12, 2013

(54) IN-VEHICLE POWER TRANSMISSION DEVICE AND POWER TRANSMISSION SYSTEM FOR VEHICLE

(75) Inventors: Koji Kawasaki, Anjo (JP); Takenori Matsue, Anjo (JP); Yuji Tokudome, Okazaki (JP); Mitsuo Inagaki, Okazaki (JP); Oyuki Ogawa, Okazaki (JP)

(73) Assignee: Nippon Soken, Inc., Nishio (JP)

( * ) Notice: Subject to any disclaimer, the term of this patent is extended or adjusted under 35 U.S.C. 154(b) by 622 days.

(21) Appl. No.: 12/764,645

(22) Filed: Apr. 21, 2010

(65) Prior Publication Data

US 2010/0273605 A1 Oct. 28, 2010

(30) Foreign Application Priority Data

Apr. 28, 2009 (JP) ................................ 2009-108710
Apr. 28, 2009 (JP) ................................ 2009-108711

(51) Int. Cl.
*F16H 3/56* (2006.01)
*F16H 37/06* (2006.01)
*B60K 17/28* (2006.01)
*B60W 10/08* (2006.01)

(52) U.S. Cl.
USPC ......... 475/5; 180/53.5; 180/53.8; 180/65.285

(58) Field of Classification Search
USPC ................. 475/5; 180/53.5, 53.8, 65.285
See application file for complete search history.

(56) References Cited

U.S. PATENT DOCUMENTS 5,558,173 A * 9/1996 Sherman .................... 180/53.8
5,722,502 A 3/1998 Kubo
6,732,526 B2 5/2004 Minagawa et al.
6,845,832 B2 * 1/2005 Takizawa et al. ............ 180/53.8
6,887,175 B2 5/2005 Yamauchi et al.
7,028,794 B2 * 4/2006 Odahara et al. .................. 475/5

(Continued)

FOREIGN PATENT DOCUMENTS

JP A-9-46821 2/1997
JP A-11-180173 7/1999

(Continued)

OTHER PUBLICATIONS

Oct. 30, 2012 Office Action issued in Japanese Patent Application No. 2009-108710; with partial English-language translation.

(Continued)

*Primary Examiner* — Justin Holmes
*Assistant Examiner* — Jacob S Scott
(74) *Attorney, Agent, or Firm* — Oliff & Berridge, PLC

(57) ABSTRACT

An in-vehicle power transmission apparatus is equipped with a motor-generator working as an engine to drive a vehicle and a power split device made up of a plurality of power split rotors. A first one of the rotors is coupled to a driven wheel of the vehicle, while a second one of the rotors is coupled to an accessory such as an air compressor of an air conditioner. The speed of the second rotor is controllable independently of that of the driven wheel. This eases restrictions on the supply of power produced by the generator-motor to the accessory. Alternatively, the rotors are so linked that when the speed of the first rotor is not zero (0), the speed of the second rotor has one of zero (0) and a value other than zero (0), thus ensuring the stability in supplying the power to drive the vehicle to the accessory.

17 Claims, 25 Drawing Sheets

(56) References Cited

U.S. PATENT DOCUMENTS

| | | | |
|---|---|---|---|
| 2008/0032842 A1* | 2/2008 | Johnson et al. | 475/5 |
| 2008/0242498 A1* | 10/2008 | Miller et al. | 475/5 |
| 2010/0120579 A1* | 5/2010 | Kawasaki | 475/5 |

FOREIGN PATENT DOCUMENTS

| | | |
|---|---|---|
| JP | A-2001-108073 | 4/2001 |
| JP | A-2002-204504 | 7/2002 |
| JP | A-2004-122878 | 4/2004 |
| JP | B2-3580257 | 10/2004 |
| JP | B2-3614409 | 1/2005 |
| JP | B2-3626151 | 3/2005 |
| JP | A-2005-121190 | 5/2005 |
| JP | A-2005-168083 | 6/2005 |
| JP | A-2006-183683 | 7/2006 |
| JP | A-2007-186199 | 7/2007 |

OTHER PUBLICATIONS

Oct. 30, 2012 Office Action issued in Japanese Patent Application No. 2009-108711; with partial English-language translation.

Jan. 29, 2013 Office Action issued in Japanese Patent Application No. 2009-108710; with English-language translation.

Jan. 29, 2013 Office Action issued in Japanese Patent Application No. 2009-108711; with English-language translation.

* cited by examiner

FIG. 2(a)
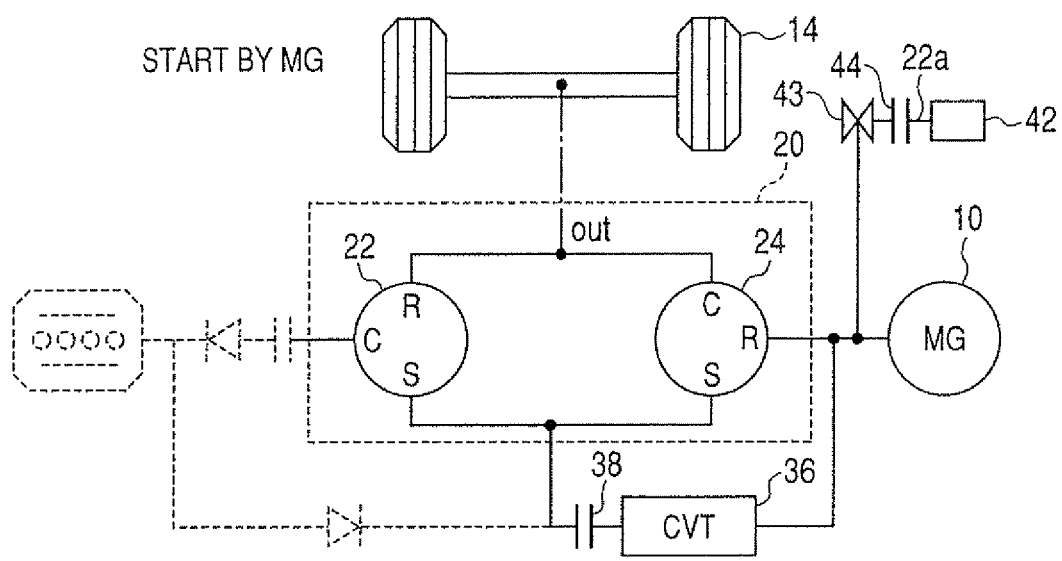
FIG. 2(b)
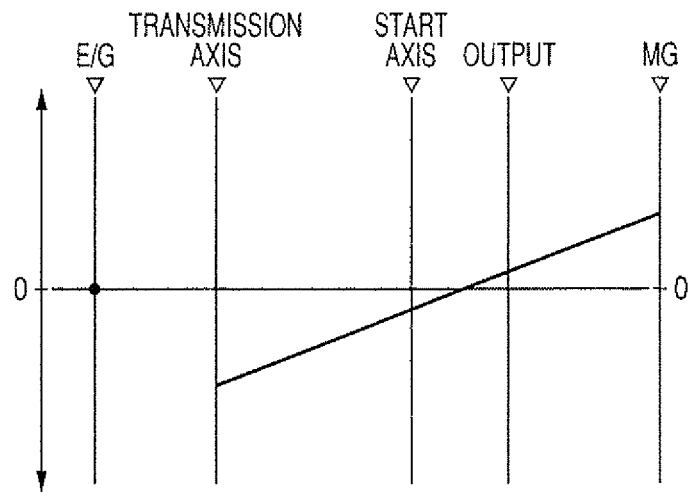
FIG. 2(c)
| ROTATIONAL DIRECTION | | | TORQUE | | | POWER | | |
|---|---|---|---|---|---|---|---|---|
| S | C | R | S | C | R | S | C | R |
| − | + | + | − | + | − | + | + | − |
| − | + | + | + | − | + | − | − | + |

FIG. 3(a)
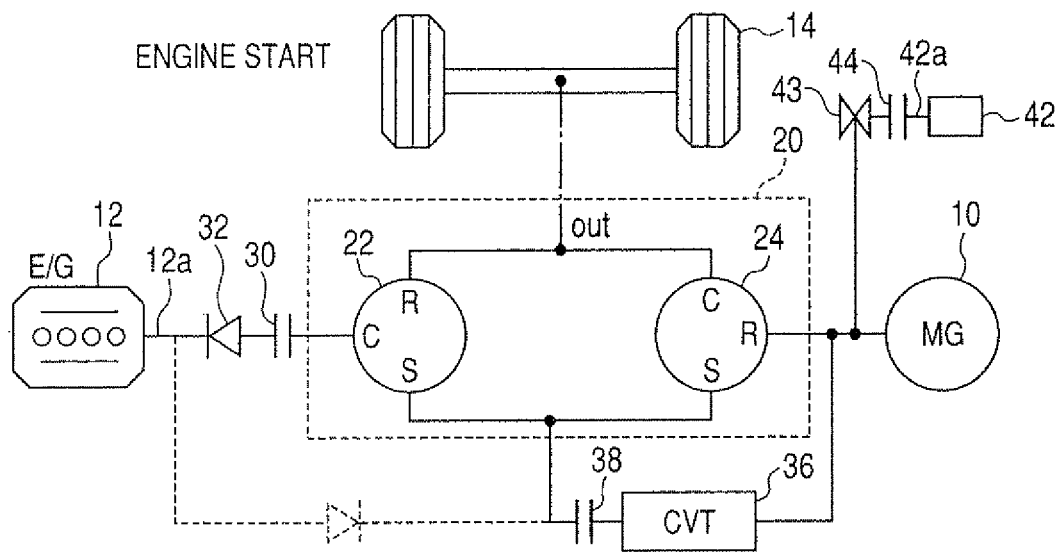
FIG. 3(b)
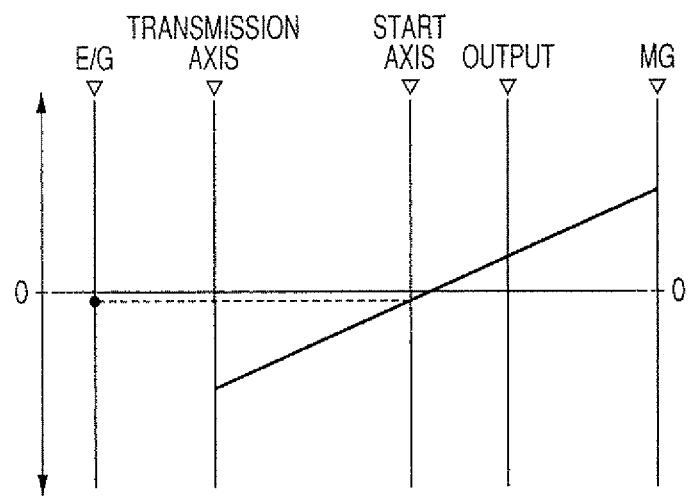
FIG. 3(c)
| ROTATIONAL DIRECTION | | | TORQUE | | | POWER | | |
|---|---|---|---|---|---|---|---|---|
| S | C | R | S | C | R | S | C | R |
| − | − | + | + | − | + | − | + | + |

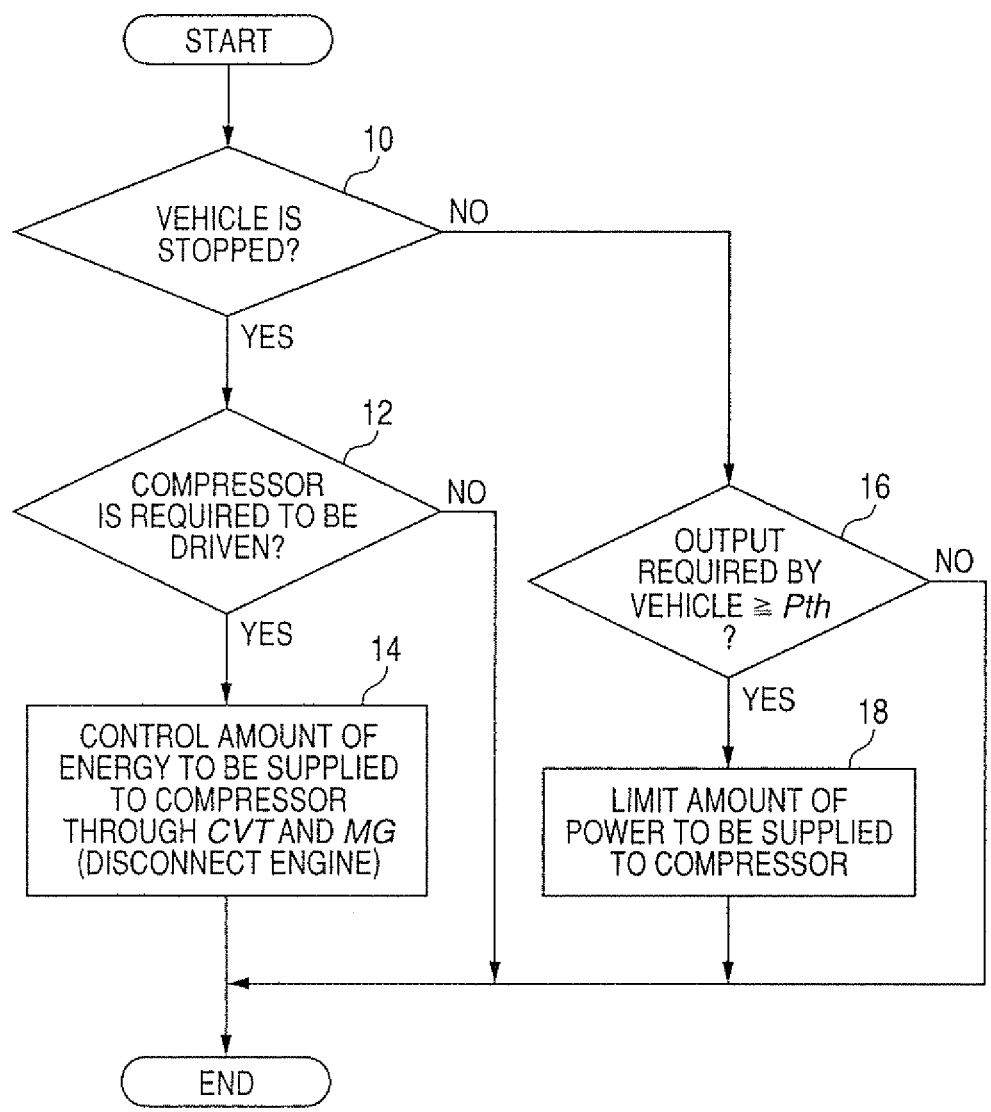

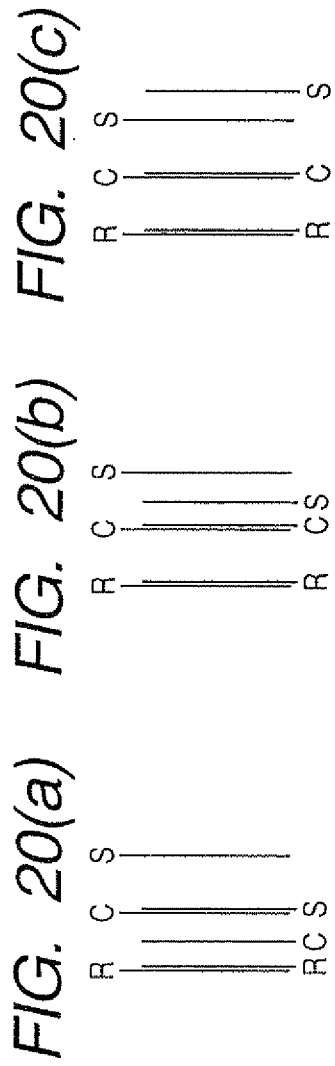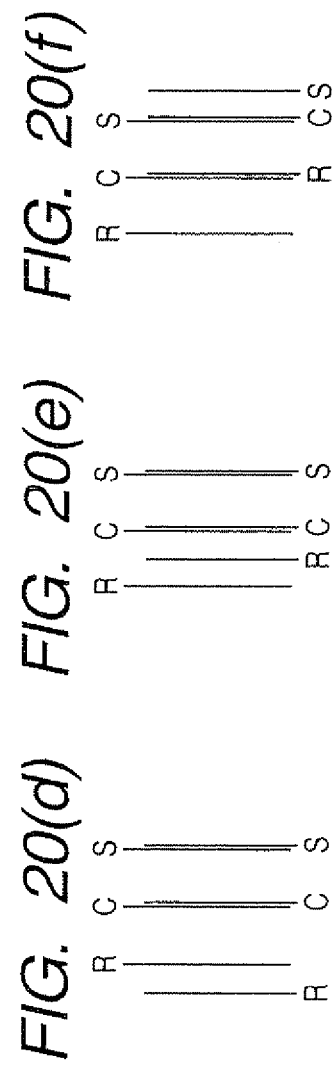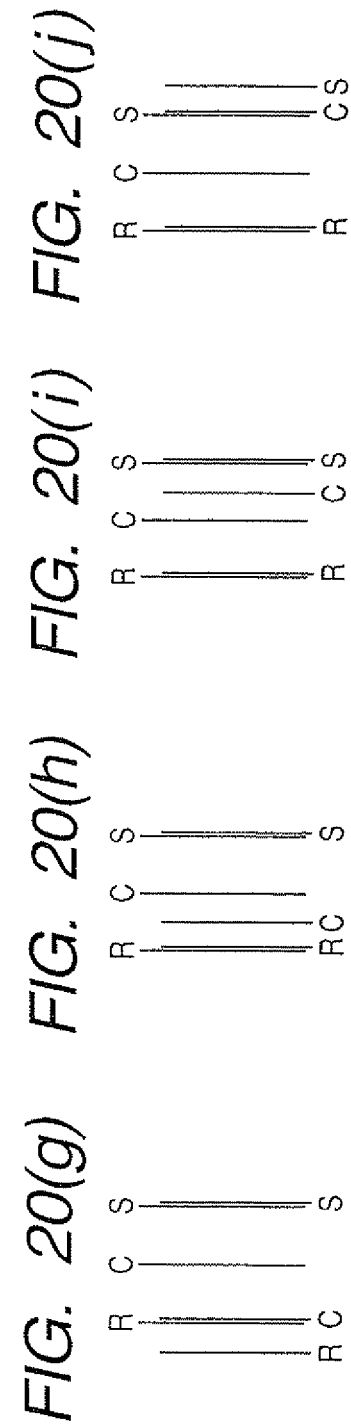

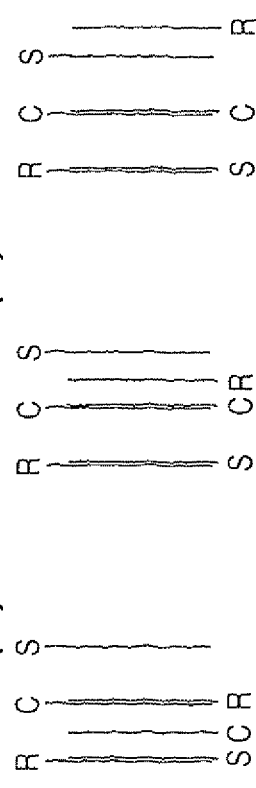
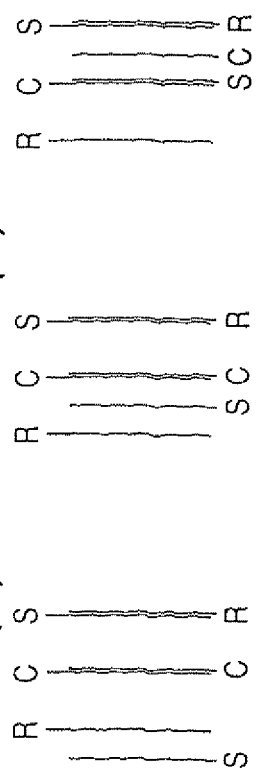
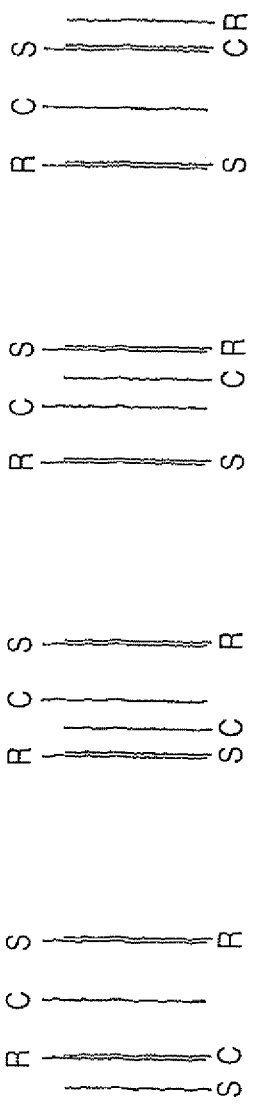
FIG. 21(a) FIG. 21(b) FIG. 21(c) FIG. 21(d) FIG. 21(e) FIG. 21(f) FIG. 21(g) FIG. 21(h) FIG. 21(i) FIG. 21(j)

IN-VEHICLE POWER TRANSMISSION DEVICE AND POWER TRANSMISSION SYSTEM FOR VEHICLE

CROSS REFERENCE TO RELATED DOCUMENT

The present application claims the benefits of priority of Japanese Patent Application Nos. 2009-108710 and 2009-108711 both filed on Apr. 28, 2009, disclosures of which are incorporated herein by reference.

BACKGROUND OF THE INVENTION

1 Technical Field of the Invention

The present invention relates generally to an in-vehicle power transmission device equipped with three or more power split rotors which work to split power or torque among an electric rotating machine (e.g., a dynamo-electric machine), a driven-wheel of a vehicle, and an accessory mounted in the vehicle and are designed to rotate in conjunction with each other, and a power control system for a vehicle equipped with such a power transmission device.

2 Background Art

In recent years, in terms of reducing the amount of energy consumed by automotive vehicles, so-called hybrid vehicles have been put into practical use which are equipped with a rotary electric drive machine working as an in-vehicle power source made up of an electric motor and a generator in addition to an internal combustion engine. The hybrid vehicles are typically controlled to stop the internal combustion engine in a low speed running range in view of the fact that the internal combustion engine is usually inefficient in energy use in the low speed running range. There have been put to practical use some of the hybrid vehicles which have a planetary gear drive equipped with a sun gear, a carrier, and a ring gear to which the generator, the internal combustion engine, and the electric motor are coupled, respectively. The driven wheels are connected mechanically to the electric motor.

Usually, when the hybrid vehicle is at a stop, the internal combustion engine, the electric motor, and the generator are all placed at rest. It is, thus, impossible to use the torque produced by the in-vehicle power source to operate a compressor of an air conditioner mounted in the vehicle when the vehicle is at a stop.

Accordingly, some of the hybrid vehicles are equipped with an additional electric motor for the compressor of the air conditioner.

The use of the above additional electric motor, however, results in an increase in total parts of the hybrid vehicle, which will lead to a decrease in cost effectiveness thereof.

Typical vehicles equipped not only with the compressor of the air conditioner, but also with the rotary electric drive machine to drive the vehicle usually face restrictions when the power is supplied from the rotary electric drive machine to an energy-consuming device (i.e., an accessory).

For example, typical hybrid vehicles are known in the following patent publications.
Japanese Patent Publication No. 3580257
Japanese Patent Publication No. 3626151
Japanese Patent Publication No. 3614409
Japanese Patent First Publication No. 9-46821

SUMMARY OF THE INVENTION

It is, therefore, a principal object of the invention to provide a power transmission apparatus for a vehicle such as an automobile which is equipped with an electric rotating machine used to drive the vehicle and works to ensure a supply of power from the electric rotating machine to an auxiliary device such as an accessory mounted in the vehicle and a power transmission control system for a vehicle equipped with such a power transmission device.

According to one aspect of the invention, there is provided a power transmission apparatus for a vehicle which may be employed in an automobile such as a hybrid vehicle or an electric vehicle. The power transmission apparatus comprises: (a) an electric is rotating machine which produces power; and (b) a power transmission mechanism including three or more power split rotors which work to rotate in conjunction with each other to split the power as torque between a driven wheel of a vehicle and an auxiliary machine mounted in the vehicle. A first rotor that is one of the power split rotors of the power transmission mechanism is coupled mechanically to the driven wheel of the vehicle. A second rotor that is another of the power split rotors provides the torque to the auxiliary machine.

Specifically, the power transmission mechanism is so designed that the torque of the second rotor is transmitted to the auxiliary machine, thereby enabling the speed of the second rotor to be controlled independently of the speed of the driven wheel. This eases restrictions on the supply of rotating energy produced by the electric rotating machine to the auxiliary machine.

In the preferred mode of the invention, the power transmission mechanism is so designed that when a speed of the first rotor is zero (0), a speed of the second rotor has a value other than zero (0). Specifically, the power transmission mechanism is operable to supply the torque, as produced by the electric rotating machine, to the auxiliary machine when the vehicle is at a stop.

The electric rotating machine is connected mechanically to one of the power split rotors which is other than the first rotor. This enables the second rotor to be rotated by the torque produced by the electric rotating machine when the vehicle is at a stop.

When a speed of the first rotor is zero (0), a speed of the second rotor is controllable by controlling a rotational speed of the electric rotating machine. This enables the torque to be supplied to the auxiliary machine by controlling the rotating speed of the electric rotating machine.

The power split rotors are so linked that rotational speeds thereof are arrayed on a straight line in a nomographic chart. At least two of the power split rotors are connected mechanically to the electric rotating machine. The speed of each of the power split rotors which lie in speed on the straight line in the nomographic chart depends upon the other two power split rotors. The speed of each of the power split rotors is, therefore, controllable by controlling the two power split rotors connected to the electric rotating machine. Specifically, the speeds of the first and second rotors are controllable by controlling the speed of the electric rotating machine.

One of the at least two of the power split rotors may be coupled to the electric rotating machine through a speed variator having a variable speed ratio. This structure enables the speeds of the two of the power split rotors to be controlled independently of each other like in the case where two electric rotating machines are coupled to the two of the power split rotors, respectively.

The power transmission mechanism may include a first planetary gear set and a second planetary gear set each of which is equipped with three rotors: a sun gear, a carrier, and a ring gear that are three of the power split rotors. Two of the power split rotors of the first planetary gear set are coupled mechanically to two of the power split rotors of the second planetary gear set. The three or more power split rotors which have the speeds lying on the straight line in the nomographic chart are implemented by four of the six rotors of the first and second planetary gear sets which have the speeds different from each other in the nomographic chart. Specifically, the four of the six rotors lie in speed on the straight line in the nomographic chart.

The first rotor lies at a middle in speed in the nomographic chart between the two of the power split rotors connected mechanically to the electric rotating machine.

The power split rotors also work to power among the driven wheel of the vehicle, the electric rotating machine, and an internal combustion engine. A breaker is further provided which works to block transmission of the power between the internal combustion engine and the power split rotors when the internal combustion engine is at a stop. Specifically, the use of the breaker enables the transmission of power between the power split rotors and the internal combustion engine to be inhibited when the internal combustion engine is at rest, and the torque is supplied from the electric rotating machine to the auxiliary machine, thereby resulting in a decrease in loss of energy transmitted from the electric rotating machine to the auxiliary machine.

The three or more power split rotors may be, as described above, so linked that the rotational speeds thereof are arrayed on the straight line in the nomographic chart. At least one of the power split rotors is connected mechanically to the electric rotating machine. When the speed of the first rotor is zero (0), the speed of the second rotor is controllable by stopping the driven wheel through a brake and regulating a rotational speed of the electric rotating machine. This enables the amount of rotating energy which is to be supplied to the auxiliary machine to be controlled by controlling the rotating speed of the electric rotating machine through the brake.

The power transmission apparatus may further include a switch which works to switch the first rotor coupled mechanically to the driven wheel to another of the power split rotors. The requirement to bring the speed of the driven wheel to a target value applies restrictions to the rotating speed of the power split rotors, which also applies restrictions to a main engine to drive the vehicle. The requirement to bring the speed of the driven wheel into agreement with the target value may, therefore, be an obstruction to an operation of the main engine in an effective range. The switch is, however, operable to change one of the power split rotors which is mechanically coupled to the driven wheel to another, thereby easing the restrictions on the speed of the main engine under the requirement to bring the speed of the driven wheel into agreement with the target value. This ensures the operation of the main engine in the effective range.

The auxiliary machine may be an accessory mounted in the vehicle which is required to be driven when the vehicle is at a stop. The power transmission apparatus is operable to supply the power to the accessory even when the vehicle is at a stop.

The auxiliary machine may be a compressor for an air conditioner mounted in the vehicle.

The power transmission apparatus may also include an electronically controlled breaker which works to transmission of the power between the second rotor and the auxiliary machine. This enables the supply of power to the auxiliary machine to be cut when the auxiliary machine is not required to be driven.

According to the second aspect of the invention, there is provided a power transmission control system for a vehicle which comprises: (a) an electric rotating machine which produces power; (b) a power transmission apparatus including a power transmission mechanism equipped with three or more power split rotors which rotate in conjunction with each other to split the power as torque between a driven wheel of a vehicle and an auxiliary machine mounted in the vehicle, a first rotor that is one of the power split rotors of the power transmission mechanism being coupled mechanically to the driven wheel of the vehicle, a second rotor that is another of the power split rotors and through which the torque being transmitted to the auxiliary machine; and (c) a controller which works to bring a speed of the second rotor to a value other than zero (0) when a speed of the first rotor is zero (0).

According to the third aspect of the invention, there is provided a power transmission control system for a vehicle which comprises: (a) an electric rotating machine which produces power; (b) a power transmission apparatus including a power transmission mechanism equipped with three or more power split rotors which rotate in conjunction with each other to split the power as torque between a driven wheel of a vehicle and an auxiliary machine mounted in the vehicle, a first rotor that is one of the power split rotors of the power transmission mechanism being coupled mechanically to the driven wheel of the vehicle, a second rotor that is another of the power split rotors provides torque to the auxiliary machine; and (c) a controller which works to limit an amount of energy consumed by the auxiliary machine when an output of the electric rotating machine is required to be produced is greater than a given value.

According to the fourth aspect of the invention, there is provided a power transmission apparatus for a vehicle which comprise: (a) an electric rotating machine which produces power; and (b) a power transmission mechanism including three or more power split rotors which work to rotate in conjunction with each other to split the power as torque between a driven wheel of a vehicle and an auxiliary machine mounted in the vehicle. A first rotor that is one of the power split rotors of the power transmission mechanism is coupled mechanically to the driven wheel of the vehicle. A second rotor that is another of the power split rotors provides torque to the auxiliary machine. The power transmission mechanism is so designed that when a speed of the first rotor is not zero (0), a speed of the second rotor has one of zero (0) and a value other than zero (0).

Specifically, even when the speed of the first rotor is not zero (0), the second rotor serving as a power source for the auxiliary machine may have either of zero (0) or any value other than zero (0), thus ensuring the stability in supplying the power from the electric rotating machine working to drive the vehicle to the auxiliary machine.

In the preferred mode of the invention, the three or more power split rotors may be so linked that rotational speeds thereof are arrayed on a straight line in a nomographic chart. The second rotor may be implemented by one of the power split rotors which is the lowest in speed in the nomographic chart when the speed of the first rotor is not zero (0).

Additionally, at least two of the power split rotors may be connected mechanically to the electric rotating machine. The speed of each of the power split rotors which lie in speed on the straight line in the nomographic chart depends upon the other two power split rotors. The speed of each of the power split rotors is, therefore, controllable by controlling the two power split rotors connected to the electric rotating machine. Specifically, the speeds of the first and second rotors are controllable by controlling the speed of the electric rotating machine.

One of the at least two of the power split rotors may be coupled to the electric rotating machine through a speed variator having a variable speed ratio. This structure enables the speeds of the two of the power split rotors to be controlled independently of each other like in the case where two electric rotating machines are coupled to the two of the power split rotors, respectively.

The second rotor lies at a middle in speed in the nomographic chart between the two of the power split rotors connected mechanically to the electric rotating machine. This enables the speed of the second rotor to be brought into agreement with zero (0) or any value other than zero (0) even when the speed of the electric rotating machine is not zero (0).

The power split rotors also work to power among the driven wheel of the vehicle, the electric rotating machine, and an internal combustion engine. One of the three or more power split rotors which lie in speed on the straight line in the nomographic chart is the second rotor. At least two of the three of more power split rotors which lie in speed on the straight line in the nomographic chart are connected mechanically to the electric rotating machine. The power transmission apparatus also includes a first power transmission mechanism and a second power transmission mechanism. The first power transmission mechanism works to selectively establish and block transmission of power between a rotating shaft of the internal combustion engine and one of the power split rotors which is other than the first rotor and serves as an engine starting rotor whose speed lies at a middle of the speeds of the power split rotors in the nomographic chart. The second power transmission mechanism works to selectively establish and block transmission of power between the internal combustion engine and one of the power split rotors which is other than the engine starting rotor and serves as a power transmission rotor. Specifically, the engine starting rotor serves to apply the torque to the rotating shaft of the internal combustion engine and also apply the torque, as produced by the internal combustion engine, to the power transmission rotor. The connections of the engine starting rotor and the power transmission rotor to the internal combustion engine is enabled to be established or blocked, thus ensuring the start of the internal combustion engine when the speed of the engine starting rotor is useful in starting the internal combustion engine. After the engine is started up, the torque of the internal combustion engine may be transmitted to the driven wheel through the power transmission rotor. This enables the internal combustion engine to run at a speed different from that of the engine starting rotor, and an output of the internal combustion engine is used. Therefore, it is possible to start the internal combustion engine to bring the speed thereof to within an effective speed range quickly.

The engine starting rotor is the second rotor. The engine starting rotor is used to rotate the engine at a low speed, meaning that it is easily regulated in speed to zero (0) or any value other than zero (0). The second rotor is, therefore, implemented by the engine starting rotor The power transmission mechanism includes a first planetary gear set and a second planetary gear set each of which is equipped with three rotors: a sun gear, a carrier, and a ring gear that are three of the power split rotors. Two of the power split rotors of the first planetary gear set being coupled mechanically to two of the power split rotors of the second planetary gear set. The three or more power split rotors which have the speeds lying on the straight line in the nomographic chart are implemented by four of the six rotors of the first and second planetary gear sets which have the speeds different from each other in the nomographic chart. Specifically, the four of the six rotors lie in speed on the straight line in the nomographic chart.

The auxiliary machine is an accessory mounted in the vehicle which is required to be driven when the vehicle is at a stop.

The auxiliary machine may be a compressor for an air conditioner mounted in the vehicle.

According to the fifth aspect of the invention, there is provided a power transmission control system for a vehicle which comprises: (a) an electric rotating machine which produces power; (b) a power transmission apparatus including a power transmission mechanism equipped with three or more power split rotors which rotate in conjunction with each other to split the power as torque between a driven wheel of a vehicle and an auxiliary machine mounted in the vehicle, a first rotor that is one of the power split rotors of the power transmission mechanism being coupled mechanically to the driven wheel of the vehicle, a second rotor that is another of the power split rotors providing torque to the auxiliary machine, and (c) a controller which works to bring a speed of the second rotor to a value other than zero (0) depending upon a degree of requirement to drive the auxiliary machine when a speed of the first rotor is zero (0).

According to the sixth aspect of the invention, there is provided a power transmission control system for a vehicle which comprises: (a) an electric rotating machine which produces power; (b) a power transmission apparatus including a power transmission mechanism equipped with three or more power split rotors which rotate in conjunction with each other to split the power as torque between a driven wheel of a vehicle and an auxiliary machine mounted in the vehicle, a first rotor that is one of the power split rotors of the power transmission mechanism being coupled mechanically to the driven wheel of the vehicle, a second rotor that is another of the power split rotors providing torque to the auxiliary machine, and (c) a controller which works to limit an amount of energy consumed by the auxiliary machine when an output of the electric rotating machine is required to be produced is greater than a given value.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(a) is a schematic block diagram which shows a power transmission path when a vehicle is started by a motor-generator;

FIG. 2(b) is a nomographic chart which represents an operation of a power split device of the power transmission device of FIG. 1 along with the speed of an internal combustion engine;

FIG. 2(c) is a table which lists a relation in sign of rotational direction, torque, and power among a sun gear, a carrier, and a ring gear of the power split device of FIGS. 2(a) and 2(b);

FIG. 3(a) is a schematic block diagram which shows a power transmission path when an internal combustion engine is started by a power split device of FIG. 1(a);

FIG. 3(b) is a nomographic chart which represents an operation of a power split device along with the speed of an internal combustion engine;

FIG. 3(c) is a table which lists a relation in sign of rotational direction, torque, and power among a sun gear, a carrier, and a ring gear of the power split device of FIGS. 3(a) and 3(b);

FIG. 5 is a flowchart of a power supply tasks to supply power to an accessory mounted in a vehicle which is to be executed by the power transmission apparatus of FIGS. 1(a) and 1(b);

FIGS. 20(a) to 20(j) are nomographic charts which represent modified structures of a power split device of the invention;

FIG. 21(a) to FIG. 21(j) are nomographic charts which represent modified structures of a power split device of the invention;

DESCRIPTION OF THE PREFERRED EMBODIMENTS

Figure 1A:
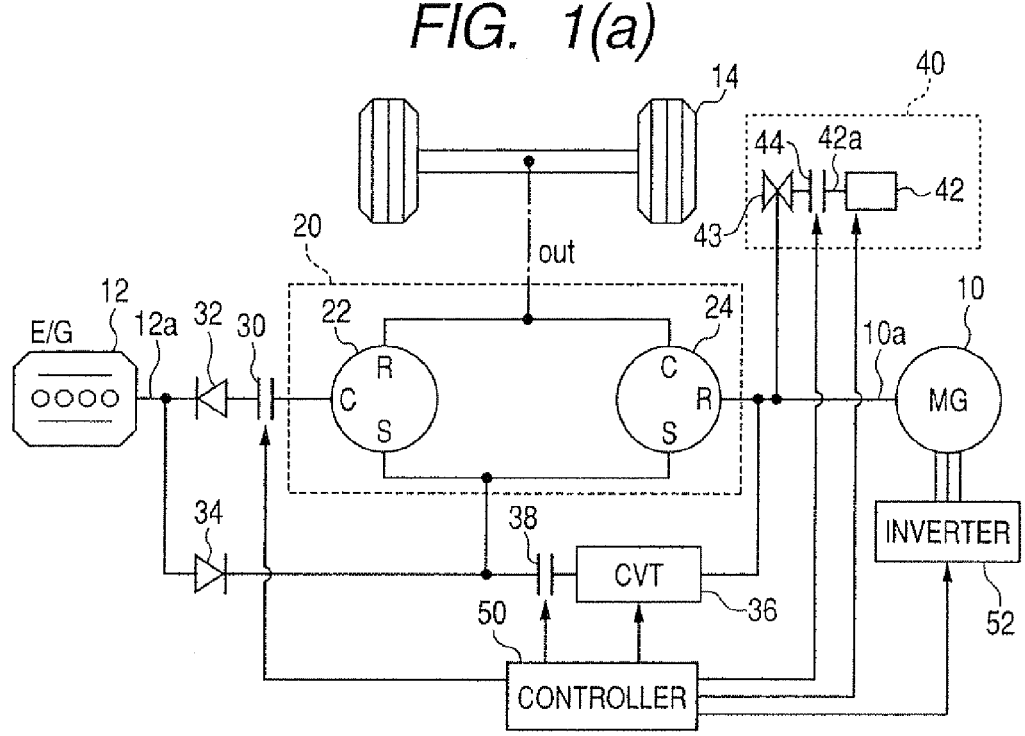
FIG. 1(a) is a block diagram which illustrates a hybrid system for a vehicle in which a power transmission device according to the first embodiment of the invention is installed.
Figure 1B:
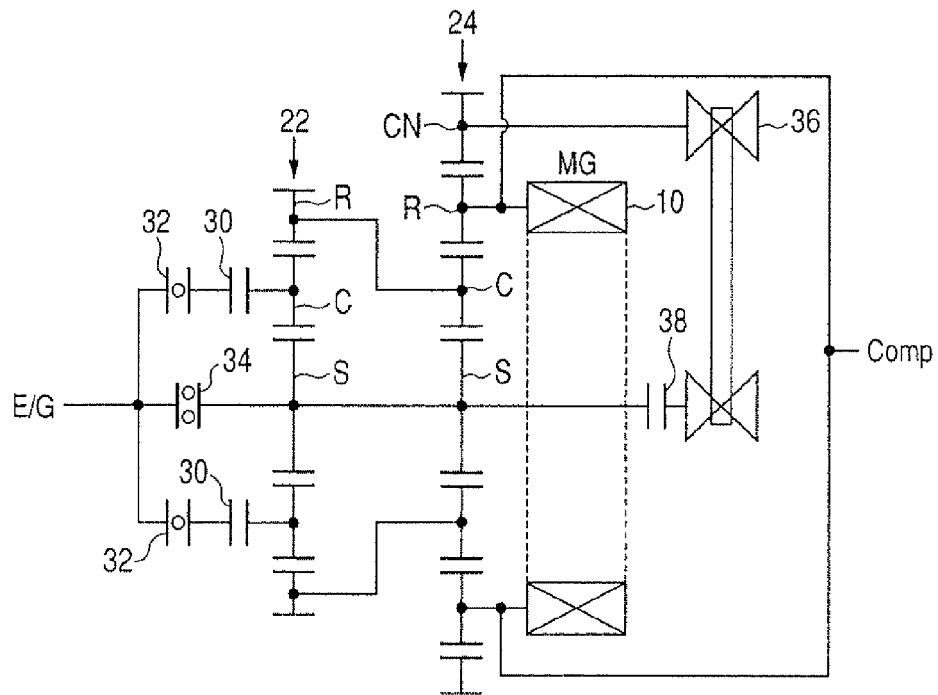
FIG. 1(b) is a skeleton view of power transmission paths of the power transmission device of FIG. 1(a)

Referring to the drawings, wherein like reference numbers refer to like parts in several views, particularly to FIGS. 1(a) and 1(b), there is shown a hybrid system including an in-vehicle power control system equipped with an in-vehicle power transmission device according to the first embodiment of the invention. The in-vehicle power transmission device of this invention may alternatively be used with either an electric vehicle (EV) equipped only with an electric motor as a power source for running a road wheel. The power control system is equipped with the power transmission device and a controller working to control an operation of the power transmission device. The power control system may also have installed therein a power source such as a motor-generator, an electric motor, or an internal combustion engine.

FIG. 1(a) illustrates the structure of the hybrid system. FIG. 1(b) is a skeleton view of power transmission paths.

The hybrid system includes a motor-generator 10 and a power split device 20. The motor-generator 10 is made of a three-phase ac motor-generator and works as a power producing device or main engine along with an internal combustion engine 12. The power split device 20 works to split power or torque among the motor-generator 10, the internal combustion engine (e.g., a gasoline engine) 12, and driven wheels 14 of an automotive vehicle.

The power split device 20 includes a first planetary gear set 22 and a second planetary gear set 24. The first planetary gear set 22 has a ring gear R joined mechanically to a carrier C of the second planetary gear set 24 and also has a sun gear S joined mechanically to a sun gear S of the second planetary gear set 24. To the ring gear R of the second planetary gear set 24, an output axis 10a (i.e. a rotating shaft) of the motor-generator 10 is coupled mechanically. The driven wheels 14 of the vehicle are joined mechanically to the ring gear R of the first planetary gear set 22 and the carrier C of the second planetary gear set 24. Specifically, the ring gear R of the first planetary gear set 22 and the carrier C of the second planetary gear set 24 are coupled mechanically to the driven wheels 14 through a typical differential gear and a typical drive shaft. Note that rotors (which will also be referred to as power split rotors below) of the power split device 20, as referred to herein, are not limited to the sun gears S, the carriers C, and the ring gears R of the first and second planetary gear sets 22 and 24, but may additionally or only include rotating parts of the differential gear and/or the drive shaft.

The carrier C of the first planetary gear set 22 is connected mechanically to a crankshaft (i.e., a rotating shaft 12a) of the internal combustion engine 12 through a clutch 30 and a one-way bearing 32. The clutch 30 works as an electronically controlled mechanical breaker to break or block the transmission of power (torque) between the carrier C of the first planetary gear set 22 and the one-way bearing 32. In this embodiment, the clutch 30 is of a normally open type. The one-way bearing 32 works as a one-way transmission mechanism to permit the transmission of power (torque) from the clutch 30 to the engine 12 under the condition that the rotational speed of the clutch 30 is not lower than that of the rotating shaft 12a of the engine 12. In other words, when the clutch 20 is engaged, the one-way bearing 32 works to have the rotating shaft 12a of the engine 12 follow the rotation of the carrier C of the first planetary gear set 22 unless the speed of the rotating shaft 12a of the engine 12 is greater than that of the carrier C of the first planetary gear set 22.

A one-way bearing 34 is disposed among the sun gear S of the first planetary gear set 22, the sun gear S of the second planetary gear set 24, and the rotating shaft 12a of the engine 12. Like the one-way bearing 32, the one-way bearing 34 works as a one-way transmission mechanism to permit the transmission of power (torque) from the engine 12 to the first and second planetary gear sets 22 and 24 under the condition that the speed of the rotating shaft 12a of the engine 12 is not lower than the speed of the sun gears S. In other words, the one-way bearing 34 works to have the sun gears S of the first and second planetary gear sets 22 and 24 follow the rotation of the rotating shaft 12a of the engine 12 unless the speed of the sun gears S is greater than that of the rotating shaft 12a.

The sun gears S of the first and second planetary gear sets 22 and 24 are coupled mechanically to a rotating shaft 10a of the motor-generator 10 through a clutch 38 and a continuously variable transmission (CVT) 36. The CVT 36 is, as can be seen from FIG. 1(b), joined mechanically to the ring gear R of the second planetary gear set 24 through a counter gear CN. In other words, the sun gears S of the first and second planetary gear sets 22 and 24 are so linked as to receive the torque from the motor-generator 10 without any rotating parts or rotors (i.e., the power split rotors) of the power split device 20 which engage the sun gears S. The number of teeth of the counter gear CN may be either identical with or different from that of the ring gear R of the second planetary gear set 24. The CVT 36, as used in this embodiment, is of a mechanical type using a metallic or rubber belt. The clutch 38 functions as an electronically controlled mechanical breaker to block or open the transmission of power between the CVT 36 and the sun gears S of the first and second planetary gear sets 22 and 24.

An in-vehicle air conditioner 40 is also connected mechanically to the ring gear R of the second planetary gear set 24. Specifically, the air conditioner 40 is equipped with a compressor 42. The compressor 42 has a driven shaft 42a coupled mechanically to the ring gear R of the second planetary gear set 24. In the illustrated example, the rotating shaft 10a of the motor-generator 10 is joined to the driven shaft 42a of the compressor 42 through a pulley 43. An electronically-controlled clutch 44 is also disposed between the ring gear R of the second planetary gear set 24 and the compressor 42 to block the transmission of power therebetween. Specifically, the transmission of power between the driven shaft 42a and the pulley 43 is electronically controlled by the clutch 44. The compressor 42 is of a variable displacement type.

The hybrid system also includes a controller 50 to control an operation of the power transmission device. The controller 50 works to actuate the clutches 30 and 38 to control the operation of the power transmission device and determine a controlled variable for the engine 12. The controller 50 also works to control an operation of an inverter 52 to determine a controlled variable for the motor-generator 10 and also control a discharge capacity or a supply of energy of the compressor 42.

Next, a vehicle running control task and a compressor drive energy supply control task to control a supply of energy to drive the compressor 42 which are to be executed by the controller 50 will be described below.

Vehicle Running Control

A vehicle starting operation using the power transmission device and starting control of the engine 12 will be described below.

First, the vehicle starting operation using the motor-generator 10 will be discussed with reference to FIGS. 2(a) and 2(b). FIG. 2(a) illustrates a power transmission path when the vehicle is started. FIG. 2(b) is a nomographic chart which represents the operation of the power split device 20 along with the speed of the engine 12. In the illustrated case, the clutch 30 is blocking the connection between the one-way bearing 32 and the carrier C of the first planetary gear set 22. The clutch 38 is connecting between the CVT 36 and the sun gears S of the first and second planetary gear sets 22 and 24.

In the example of FIG. 2(b), the engine 12 is at a stop. The speeds of the rotors of the first and second planetary gear sets 22 and 24 which constitute the power split device 20 depend upon the speed of the motor-generator 10 and the gear ratio (also called an input-to-output speed ratio, a variable speed ratio, a pulley ratio, or a CVT ratio) of the CVT 36. Specifically, in the nomographic chart of FIG. 2(b), the speed of the sun gears S of the first and second planetary gear sets 22 and 24 (i.e., the speed of a transmission shaft or axis in FIG. 2(b)), the speed of the carrier C of the first planetary gear set 22 (i.e., the speed of a starting axis in FIG. 2(b)), the speed of the ring gear R of the first planetary gear set 22 and the carrier C of the second planetary gear set 24 (i.e., the speed of output in FIG. 2(b)), and the ring gear R of the second planetary gear set 24 (i.e., the speed of the MG 10) lie on a diagonal straight line. The speeds of the rotors of the power split device 20 other than the sun gears S of the first and second planetary gear sets 22 and 24 and the ring gear R of the second planetary gear set 24 are, therefore, set by determining the speeds of the sun gears S and the ring gear R of the second planetary gear set 24. The sun gears S, the carriers C, and the ring gears R of the first and second planetary gear sets 22 and 24 rotate in conjunction with each other. For instance, the speed of the carriers C may be zero (0) depending upon the speeds of the sun gears S and the ring gears R.

The structure of the power transmission device of this embodiment is designed to enable the motor-generator 10 to produce a higher degree of torque when starting the vehicle without need for increasing the size of the motor-generator 10. This is for the following reasons.

If, in the second planetary gear set 24, a ratio of the number Zs of teeth of the sun gear S to the number Zr of teeth of the ring gear R (i.e., Zs/Zr) is defined as ρ, a ratio of the speed Nm of the motor-generator 10 to the speed Ns of the sun gear S (i.e., Nm/Ns) is defined as β, and torques of the ring gear R, the sun gear S, the carrier C, and the motor-generator 10 are defined as Tr, Ts, Tc, and Tm, respectively, equations, as listed below, are met.

$$Tr = -Tc(1+\rho) \quad (c1)$$

$$Ts = -\rho Tc(1+\rho) \quad (c2)$$

$$\beta(Tm+Tr) = Ts \quad (c3)$$

Eliminating torques Tr and Ts from Eq. (c3) using Eqs. (c1) and (c2), we obtain $$Tc = (1+\rho)Tm/\{(\rho/\beta)-1\} \quad (c4)$$

Eq. (c4) shows that a great increase in torque Tc of the carrier C of the second planetary gear set 24 (i.e., the output axis of the power split device 20), in other words, the torque to be transmitted to the driven wheels 14 is achieved by approximating the ratios ρ and β to each other. This ensures the torque required to start the vehicle without need for increasing the size of the motor-generator 10.

The hybrid system of this embodiment is capable of selecting the gear ratio (i.e., a speed ratio) of the CVT 36 to achieve the so-called geared neutral which places the speed of the driven wheels 14 at zero (0) during running of the motor-generator 10. Specifically, the power split device 20 is so designed that amounts of output rotational energy (i.e., power) of the sun gear S and the ring gear R that are the rotors of the second planetary gear set 24 other than the carrier C coupled to the driven wheels 14 are, as illustrated in FIG. 2(c), opposite in sign to each other. Therefore, when the geared neutral is established to place the speed of the driven wheels 14 at zero (0), it will cause the power to be circulated between the sun gear S and the ring gear R through a looped mechanical path equipped with the clutch 38 and the CVT 36. In other words, when the power split device 20 is in the geared neutral, the amount of rotational energy (i.e., power) outputted to the driven wheels 14 will be zero (0). If the power is not circulated through the looped mechanical path extending through the sun gear S and the ring gear R, it will cause the output energy of the motor-generator 10 to be consumed fully as thermal energy in the second planetary gear set 24 according to the energy conservation law. This will result in impractical structure of the second planetary gear set 24 which does not work to split the power, in other words, in which the rotors do not function as power split rotors of the power split device 20. When the geared neutral is established in the hybrid system of this embodiment, it will cause the power to be recirculated inevitably in the power split device 20. The looped path extending from the ring gear R, to the sun gear S of the second planetary gear set 24, and back to the ring gear R needs not continue mechanically completely. For instance, the looped path may be a path which has a disconnected portion to be closed selectively by a clutch to enable the rotational energy to be recirculted. Note that in FIG. 2(c), the plus (+) and minus (−) signs of the rotational direction of each of the sun gear S, the carrier C, and the ring gear R represent opposite directions: a normal direction and a reverse direction thereof, the plus (+) sign of the rotational energy (i.e., power) indicates when the rotational energy is outputted from the power split device 20, and the plus (+) and minus (−) signs of the torque are so defined as to meet the condition that the product of signs of the rotational direction and the torque will be the sign of the rotational energy (i.e., power).

In the geared neutral, the first planetary gear set 22 does not function to transmit the power. Specifically, the clutch 30 is disengaged, so that the torque of the carrier C will be zero (0), and thus the torque of the sun gear S and the ring gear R will also be zero (0) according to Eqs. (c1) and (c2), as described above.

The starting control of the engine 12 will be described below.

FIGS. 3(a) and 3(b) show an operation of the power transmission device to start the engine 12. FIG. 3(a) illustrates a power transmission path when the engine 12 is started. FIG. 3(b) is a nomographic chart which represents the operation of the power split device 20 along with the speed of the engine 12.

When it is required to start the engine 12, the controller 50 (not shown) engages the clutch 30 to transmit the torque from the carrier C of the first planetary gear set 22 (i.e., the torque from the starting axis) to the rotating shaft 12a of the engine 12 through the clutch 30 and the one-way bearing 32, thereby achieving initial rotation of the rotating shaft 12a of the engine 12. The rotating shaft 12a of the engine 12 is driven or rotated by the rotation of the carrier C of the first planetary gear set 22. When the speed of the rotating shaft 12a of the engine 12 is increased to a given value, the controller 50 starts to control the burning of fuel in the engine 12. At an initial stage when the fuel has started to be burned after the engine 12 is cranked, the torque on the rotating shaft 12a rises rapidly, so that the speed thereof increases quickly. At this time, the speed of the rotating shaft 12a is, however, higher than that of the carrier C, so that the torque is not transmitted to the carrier C, so that the pulsation of torque is, thus, not transmitted to the power split device 20 at the initial stage of burning of the engine 12.

The hybrid system of this embodiment is capable of regulating the speed of the carrier C of the first planetary gear set 22 to an extremely low value or exactly to zero (0). Specifically, the first planetary gear set 22 is so linked that when the clutch 30 is engaged to output a positive (+) rotational energy from the carrier C of the first planetary gear set 22 to the engine 12, some (i.e., two in this embodiment) of the power split rotors other than the carrier C of the first planetary gear set 22 are opposite in sign of output rotational energy thereof to each other, thereby enabling the carrier C of the first planetary gear set 22 to be placed at the geared neutral. Referring to FIG. 3(c), the sun gear S and the ring gear R of the first planetary gear set 22 is opposite in sign of output rotational energy (i.e., power) thereof to each other and are coupled to each other through a looped mechanical path, thus enabling the carrier C of the first planetary gear set 22 to be placed at the geared neutral in the same way, as described above with respect to the second planetary gear set 24, without need for two electric rotating machines (e.g., motor-generators): one for receiving the output rotational energy, as produced by the ring gear R, and the other for inputting the output rotational energy to the sun gear S. The looped mechanical path, like in the second planetary gear set 24, needs not continue mechanically and completely.

Figure 4A:
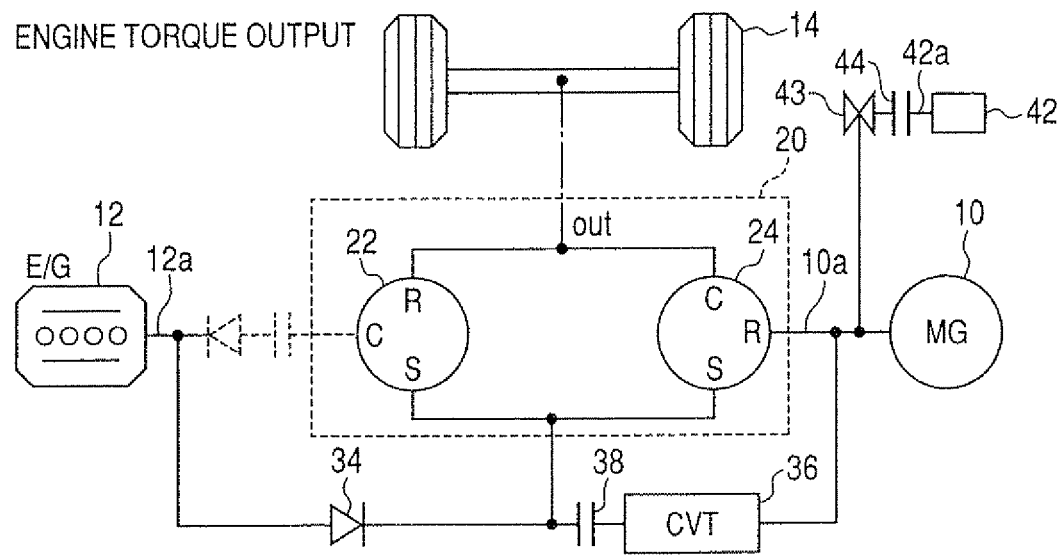
FIG. 4(a) is a schematic block diagram which shows a power transmission path when an internal combustion engine outputs torque to a power split device of FIG. 1(a)
Figure 4B:
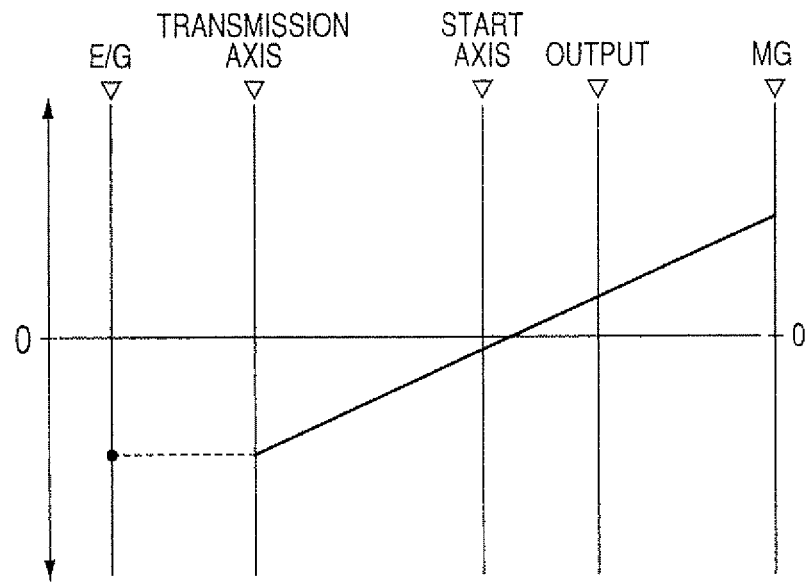
FIG. 4(b) is a nomographic chart which represents an operation of a power split device along with the speed of an internal combustion engine.

FIGS. 4(*a*) and 4(*b*) show an operation of the power transmission device after the engine 12 is started up. FIG. 4(*a*) illustrates a power transmission path through which the torque, as outputted from the engine 12 is transmitted. FIG. 4(*b*) is a nomographic chart which represents the operation of the power split device 20 along with the speed of the engine 12. The clutch 30 is disengaged to block the connection between the one-way bearing 32 and the carrier C of the first planetary gear set 22.

After the engine 12 is started up, the speed of the rotating shaft 12*a* of the engine 12 reaches the speed of the sun gears S of the first and second planetary gear sets 22 and 24 (i.e., the speed of the power transmission axis), thereby giving the torque of the engine 12 to the power split device 20. After the torque is provided from the engine 12 to the power split device 20, the controller 50 may operate the motor-generator 10 as an electric generator or turn off the inverter 52 to place the motor-generator 10 in a no-load operation.

As apparent from the above discussion, the hybrid system of this embodiment is capable of starting the internal combustion engine 12 during running of the vehicle powered by the motor-generator 10, in other words, during the operation of the motor-generator 10 without use of a typical engine starter equipped with an electric motor. The rotor used to start the engine 12 (i.e., the carrier C of the first planetary gear set 22) and the rotors to which the torque of the engine 12 is given (i.e., the sun gears S of the first and second planetary gear sets 22 and 24) are designed to be separate, in other words, disposed independently from each other, thereby enabling the speed of the rotors to which the torque is provided from the engine 12 to be elevated quickly after the starting of the engine 12. This results in an increase in time the engine 12 is run in an effective operation range.

Compressor Drive Energy Supply Control

The compressor 42, as described above, has the driven shaft 42*a* connected mechanically to the ring gear R of the second planetary gear set 24. The ring gear R of the second planetary gear set 24, therefore, serves as a power source for the compressor 42. The controller 50 monitors a required energy of the compressor 42 to regulate the gear ratio of the CVT 36 or an output of the motor-generator 10 to control the amount of power to be supplied to drive the compressor 42.

FIG. 5 is a flowchart of a sequence of logical steps or program to be executed by the controller 50 at a given time interval to control the amount of power to be supplied to the compressor 42.

After entering the program, the routine proceeds to step 10 wherein it is determined whether the vehicle is at a stop or not. This determination is made to determine whether the power required to be outputted from the motor-generator 10 to run the vehicle is zero (0) or not. If a YES answer is obtained meaning that the vehicle is stopped, then the routine proceeds to step 12 wherein it is determined whether there is a request to drive the compressor 42 or not. This determination is made to determine whether the power required to be outputted from the motor-generator 10 to drive the compressor 42 is not zero (0) or not.

If a YES answer is obtained in step 12 meaning that the compressor 42 is requiring a power input, then the routine proceeds to step 14 wherein the controller 50 regulates the gear ratio of the CVT 36 and the output of the motor-generator 10 to control the amount of power or energy to be supplied to the compressor 42 or the speed thereof. The controller 50 works to control the amount of energy to be supplied to the speed of the compressor 42 finely, but may be designed only to bring the amount of energy to be supplied to or the speed of the compressor 42 toward a required value or more in a simple manner in terms of the compressor 42 being of a variable displacement type. However, when the vehicle is at a stop, the motor-generator 10 is not required to output the power to the driven wheels 14, so that the gear ratio of the CVT 36 and the power to be outputted from the motor-generator 10 are only for driving the compressor 42. It is, therefore, advisable that the amount of energy to be supplied to or the speed of the compressor 42 be controlled finely. The gear ratio of the CVT 36 and the speed of the motor-generator 10 are to be selected to place speeds of the ring gear R of the first planetary gear set 22 and the carrier C of the second planetary gear set 24 connected mechanically to the driven wheels 14 at zero (0). In a period of time for which the operation in step 14 is performed, the clutch 30 is disengaged, so that the motor-generator 10 is not required to output torque to the rotating shaft 12*a* of the engine 12.

If a NO answer is obtained in step 10 meaning that the vehicle is running, then the routine proceeds to step 16 wherein it is determined whether the power required to be outputted from the motor-generator 10 to run the vehicle is more than or equal to a given threshold value Pth or not. This determination is made to determine whether the priority should be given to the use of power outputted by the motor-generator 10 to run the vehicle over that to drive the compressor 42 or not. Note that the threshold value Pth is set to an output of the motor-generator 10 which is expected not to satisfy a requirement to run the vehicle depending upon the degree of a request from the compressor 42. If a YES answer is obtained in step 16, then the routine proceeds to step 18 wherein the amount of energy to be supplied to the compressor 42 is restricted. This may be achieved by disconnect the clutch 44 or limit the discharge capacity of the compressor 42.

After step 14 or 18 or if a NO answer is obtained in step 12 or 16, the routine terminates.

As apparent from the above discussion, the hybrid system of this embodiment ensures the operation of the compressor 42 without having to use an additional electric motor in driving the compressor 42 when the vehicle is stopped, and then the engine 12 is stopped and especially enables the motor-generator 10 to be kept running to drive the compressor 42 with an increased efficiency when the vehicle is at rest. This is achieved by the structure which ensures the torque required to start the vehicle without having to increase the size of the motor-generator 10.

In other words, the structure of the hybrid system eliminates the need for increasing the size of the motor-generator 10. This means that a maximum amount of power required to be outputted from the motor-generator 10 to the compressor 42 (i.e. the air conditioner 40), as illustrated in FIG. 6(*a*), may be set to almost half (i.e., 50%) of a maximum amount of power to be outputted from the motor-generator 10 (i.e., the sum of power to drive the vehicle and maximum power to drive the air conditioner 40). The efficiency of the motor-generator 10 usually decreases as the output therefrom decreases in a range of a lower output to a high output which is smaller than a maximum output of the generator-motor 10. The maximum amount of power required to be supplied to the compressor 42, as described above, occupies much of the maximum amount of power to be outputted from the motor-generator 10. Therefore, the efficiency of the motor-generator 10 is enabled to be kept high when the motor-generator 10 is run only for driving the compressor 42. A maximum output of motor-generators such as ones mounted in conventional hybrid vehicles is usually 50 kW or more which is ten or more than dozen times a maximum required output of the compressor 42 (e.g., several kW). This causes the motor-generator 10 to be run to drive the compressor 42 with a low efficiency when the vehicle is at a stop.

Figure 6A:
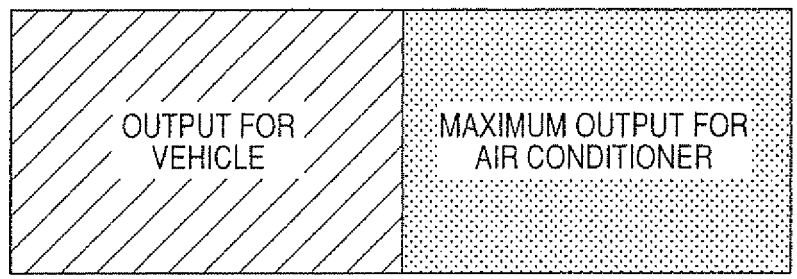
FIGS. 6(a) and 6(b) are views which demonstrate a ratio of an amount of power required to drive a vehicle and an amount of power required to drive a compressor of an air conditioner.
Figure 6B:
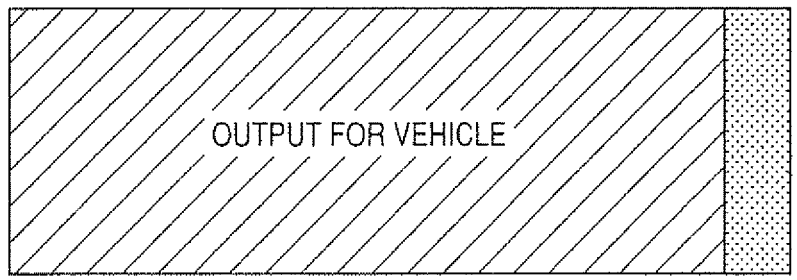

When a required output of the motor-generator 10 becomes great depending upon the degree of required traveling performance of the vehicle, the output of the motor-generator 10 may be used mainly to run the vehicle by limiting, as illustrated in FIG. 6(b), the amount of energy to drive the compressor 42. The amount of power to be outputted from the motor-generator 10, as illustrated in FIG. 6(b), to run the vehicle is different from that required in a normal traveling mode of the vehicle, but sometimes required to enhance the drivability of the vehicle during running thereof. The increase in size of the motor-generator 10 in order to meet such a demand leads to great concern about an increase in production cost thereof. In contrast, the structure of the hybrid system of this embodiment is designed to restrict the energy or power required to drive the compressor 42 to ensure the ability to accelerate the vehicle without having to increase the size of the motor-generator 10, which results in improvement on the drivability of the vehicle.

The structure of the hybrid system (i.e., the power transmission device) of this embodiment offers the following advantages.

1) The power transmission device is designed to have a second rotor (i.e., the ring gear R of the second planetary gear set 24) of the power split device 20 which is separate from first rotors (i.e., the ring gear R of the first planetary gear set 22 and the carrier C of the second planetary gear set 24) connected mechanically to the driven wheels 14 and from which the torque is transmitted to the driven shaft 42a of the compressor 42, thereby enabling the speed of the driven shaft 42a of the compressor 42 to be controlled to supply a controlled amount of rotating energy from the motor-generator 10 to the compressor 42.

2) The rotating shaft 10a of the motor-generator 10 is joined mechanically to one of power split rotors of the power split device 20 (i.e., the ring gear R of the second planetary gear set 24) which is separate from ones of the power split rotors connected mechanically to the driven wheels 14, thereby enabling the driven shaft 42a of the compressor 42 to be rotated by the torque of the motor-generator 10 when the vehicle is at a stop.

3) The power split device 20 is equipped with the six rotors which are designed to have speeds thereof lying on the straight line in the nomographic chart and has two of the rotors which are different in speeds and connected mechanically to the motor-generator 10, thereby enabling all the speeds in nomographic chart to be controlled by the speed of the motor-generator 10.

4) Of the two of the rotors of the second planetary gear set 24, as described above, which have the speeds different from each other in the nomographic chart, respectively, one is joined mechanically with the motor-generator 10 through the CVT 36, thereby enabling the two of the rotors to be controlled in speed independently from each other like the case where two motor-generators are used in connection with the two of the rotors, respectively. In the case of use of such two motor-generators, this structure may also eliminate the loss of electric energy, as produced by one of the motor-generators which is operating as a generator, when the electric energy is supplied to the other motor-generator operating as an electric motor.

5) The power split device 20 is designed to joint two of the three rotors (i.e., the sun gear, the carrier, and the ring gear) of the first planetary gear set 22 mechanically to two of the three rotors (i.e., the sun gear, the carrier, and the ring gear) of the second planetary gear set 24, respectively, thereby enabling four groups of the rotors of the power split device 20 to be arrayed in speed on the straight line in the nomographic chart, as illustrated in FIG. 2(b).

6) Of the four rotor groups (i.e., (a) the sun gears S of the first and second planetary gear sets 22 and 24, (b) the carrier C of the first planetary gear set 22, (c) the ring gear R of the first planetary gear set 22 and the carrier C of the second planetary gear set 24, and (d) the ring gear R of the second planetary gear set 24 in the first embodiment) which are to have different speeds in the nomographic chart, respectively, one (i.e., the ring gear R of the first planetary gear set 22 and the carrier C of the second planetary gear set 24) which has the middle speed in the nomographic chart is joined mechanically to the driven wheels 14, thereby facilitating ease of rotating the driven wheels 14 in a normal or a reverse direction and stopping them.

7) The power transmission device is equipped with a power blocking mechanism (i.e., the clutch 30 and the one-way bearing 34) which blocks the transmission of torque between the rotating shaft 12a of the engine 12 and the power split device 20 when the engine 12 is stopped. This eliminates the transmission of torque between the power split device 20 and the compressor 42 when the engine 12 is at a stop, and the rotating energy is supplied to the compressor 42, thereby minimizing the loss of electric energy from the motor-generator 10 to the compressor 42.

8) The power transmission device also has an electronically-controlled power blocking mechanism (i.e., the clutch 44) which blocks the transmission of power or torque between the power split device 20 and the compressor 42, thereby eliminating the consumption of torque produced by the motor-generator 10 in driving the compressor 42 when it is not required to drive the compressor 42.

9) When a required output of the motor-generator 10 is the threshold value Pth or more, the controller 50 restricts the amount of energy to be consumed by the compressor 42. This meets a requirement to run the vehicle while the maximum output of the motor-generator 10 is controlled.

Figure 7:
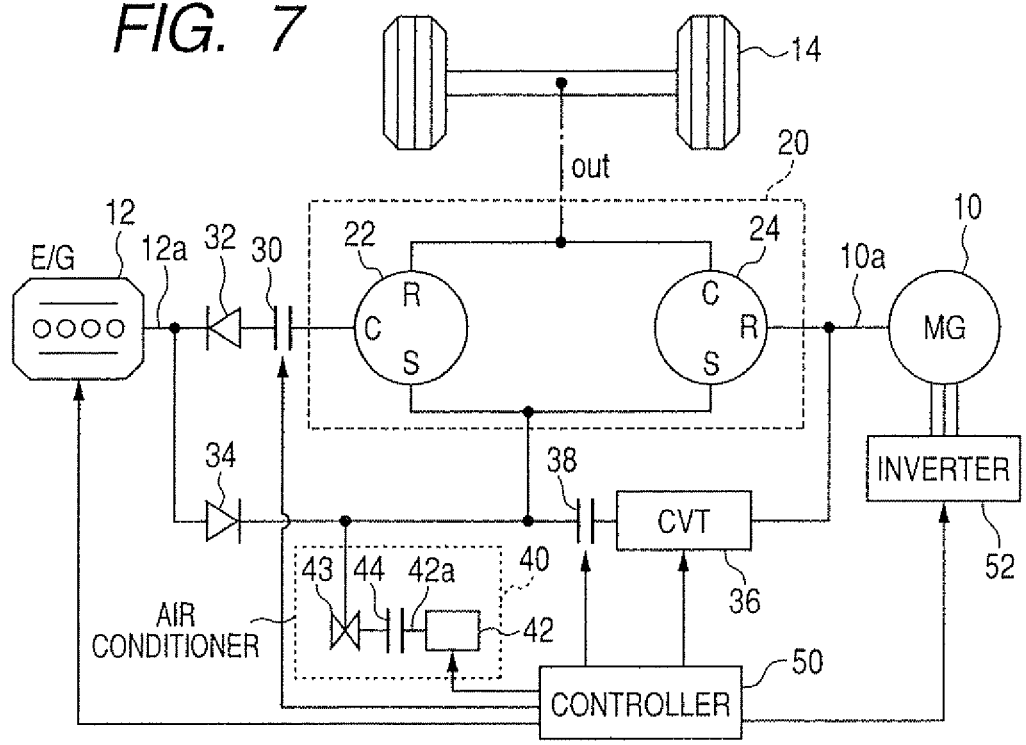
FIG. 7 is a block diagram which illustrates a power transmission device according to the second embodiment of the invention.

FIG. 7 illustrates a hybrid system according to the second embodiment of the invention. The same reference numbers as employed in FIG. 1 refer to the same parts, and explanation thereof in detail will be omitted here.

The driven shaft 42a of the compressor 42 is coupled mechanically to the sun gears S of the first and second planetary gear sets 22 and 24. This permits rotors which are to rotate together with the sun gears S to be coupled to the driven shaft 42a through a pulley. The structure of this embodiment enables the torque of the sun gears S of the first and second planetary gear sets 22 and 24 or the ring gear R of the second planetary gear set 24 to be transmitted to the driven shaft 42a of the compressor 42.

Figure 8:
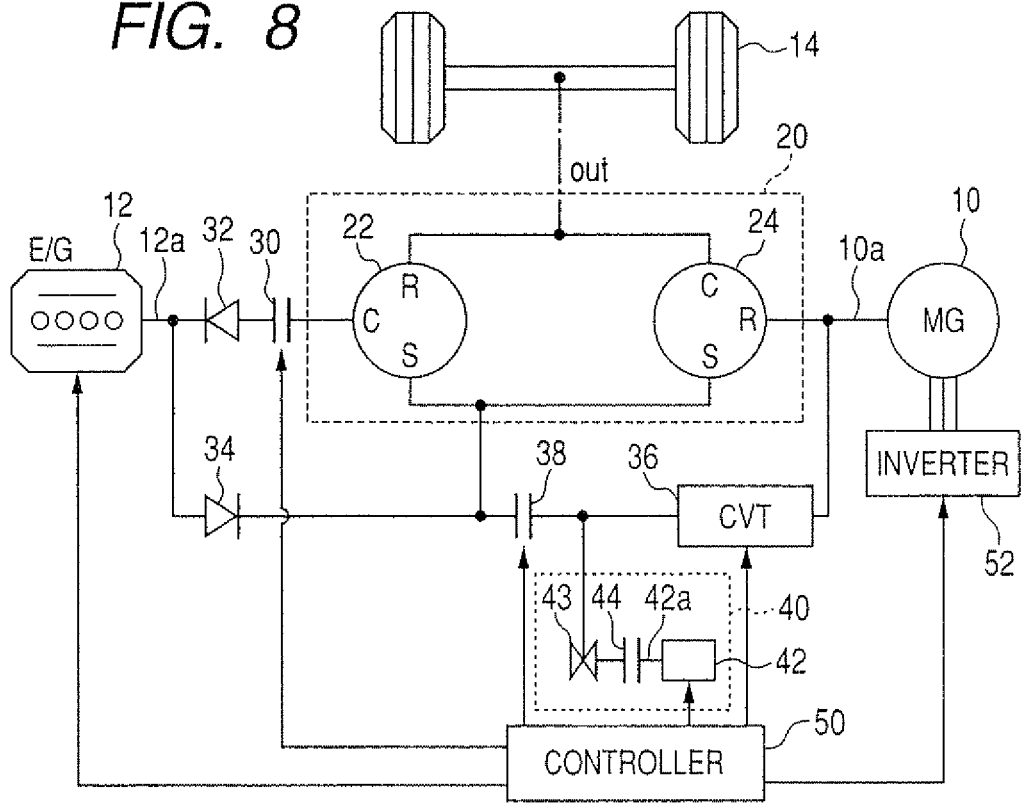
FIG. 8 is a block diagram which illustrates a power transmission device according to the third embodiment of the invention.

FIG. 8 illustrates a hybrid system according to the third embodiment of the invention. The same reference numbers as employed in FIG. 1 refer to the same parts, and explanation thereof in detail will be omitted here.

The driven shaft 42a of the compressor 42 is coupled mechanically between the clutch 38 and the CVT 36. When the clutch 38 is engaged, the driven shaft 42a is connected to the sun gears S of the first and second planetary gear sets 22 and 24. Alternatively, when the clutch 38 is disengaged, the driven shaft 42a is connected only to the ring gear R of the second planetary gear set 24 and the motor-generator 10. This enables the power to be supplied to the compressor 42 when the vehicle is at a stop.

Figure 9:
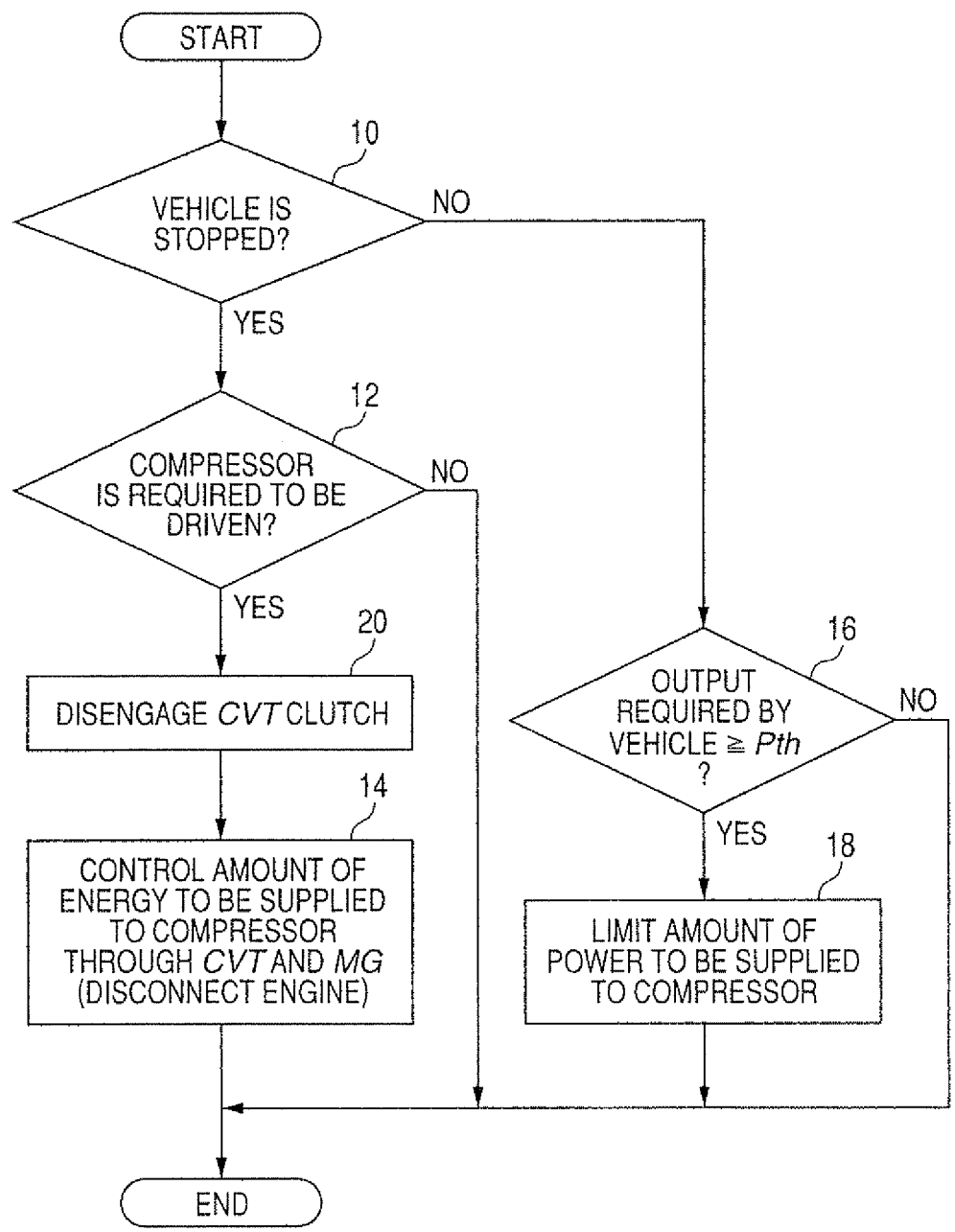
FIG. 9 is a flowchart of a power supply tasks to supply power to an accessory mounted in a vehicle which is to be executed by the power transmission apparatus of FIG. 8.

FIG. 9 is a flowchart of a sequence of logical steps or program to be executed by the controller 50 at a given time interval to control the amount of power to be supplied to the compressor 42 in the third embodiment. The same step number as employed in FIG. 5 represents the same operations, and explanation thereof in detail will be omitted here.

If a YES answer is obtained in step 12 meaning that there is a request to drive the compressor 42, the routine proceeds to step 20 wherein the clutch 38 is disengaged to block the connection of a combination of the ring gear R of the second planetary gear set 24 and the rotating shaft 10a of the motor-generator 10 to a combination of the sun gears S of the first and second planetary gear sets 22 and 24. The routine proceeds to step 14 wherein the controller 50 regulates the gear ratio of the CVT 36 and the output of the motor-generator 10 to control the amount of energy to be supplied to the compressor 42. The controller 50 keeps the speed of the driven wheels 14 at zero (0) through brakes regardless of the speed of the motor-generator 10. In the first embodiment, the speed of the ring gear R of the first planetary gear set 22 and the carrier C of the first planetary gear set 22 which are connected mechanically to the driven wheels 14 is kept zero (0) by the gear ratio of the CVT 36 and the speed of the motor-generator 10, but this control is not performed in this embodiment.

The structure of the hybrid system of this embodiment also have the following advantage in addition to the advantages (1) to (9), as described above.

10) The controller 50 works to give the torque, as produced by the motor-generator 10, to the driven shaft 42a of the compressor 42 through the CVT 36 while braking the driven wheels 14, thereby ensuring the effectiveness of supplying the torque to the compressor 42.

Figure 10:
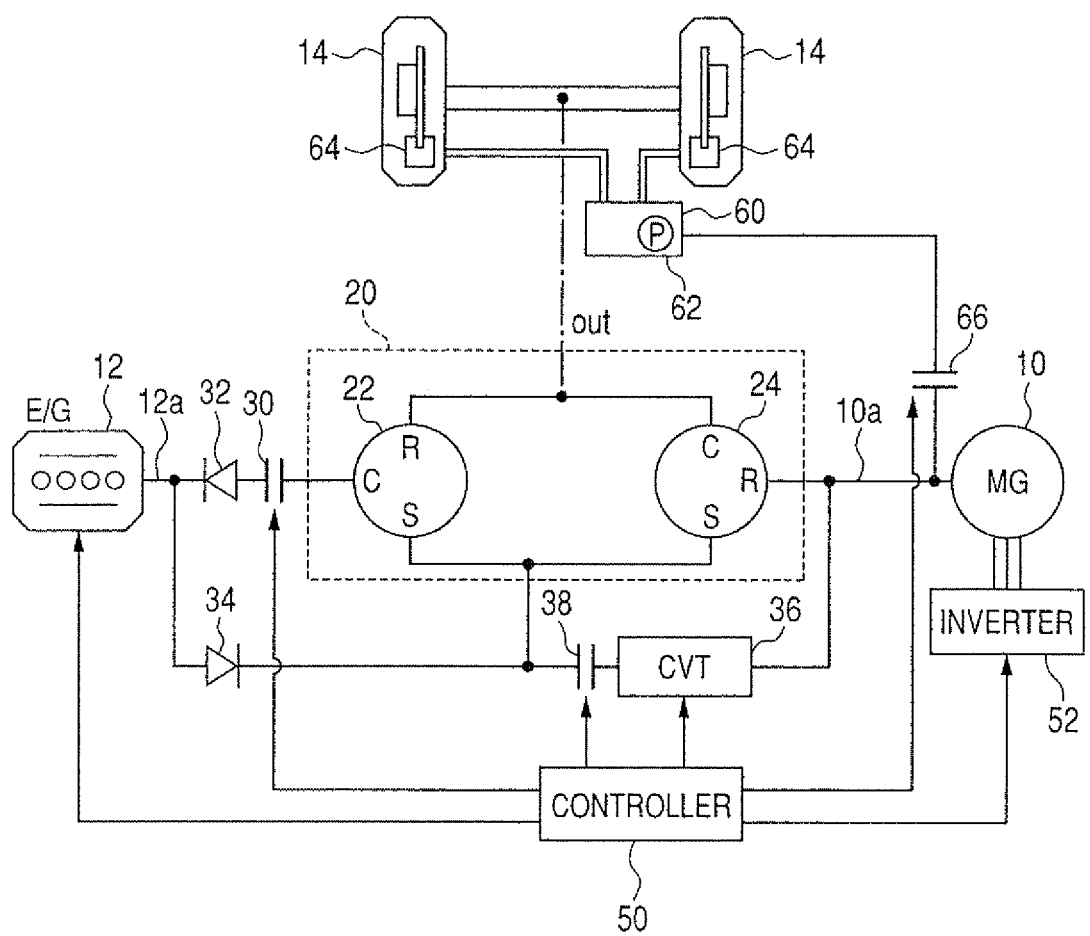
FIG. 10 is a block diagram which illustrates a power transmission device according to the fourth embodiment of the invention.

FIG. 10 illustrates a hybrid system according to the fourth embodiment of the invention. The same reference numbers as employed in FIG. 1 refer to the same parts, and explanation thereof in detail will be omitted here.

In this embodiment, an in-vehicle accessory which needs to be driven by the power split device 20 is a brake pump 62 installed in a brake actuator 60. The brake pump 62 works to produce hydraulic braking pressure which are to be supplied to wheel cylinders 64 of the driven wheels 14.

Specifically, a driven shaft of the brake pump 62 is connected mechanically to the ring gear R of the second planetary gear set 24 through an electronically-controlled clutch 66. This connection may be achieved by joining a rotary shaft which rotates along with a counter gear engaging the ring gear R of the second planetary gear set 24 to the driven shaft of the brake pump 62 through the clutch 66. This enables the torque to be supplied to the brake pump 62 in substantially the same manner as in the first embodiment which supplied the torque to the compressor 42.

Figure 11:
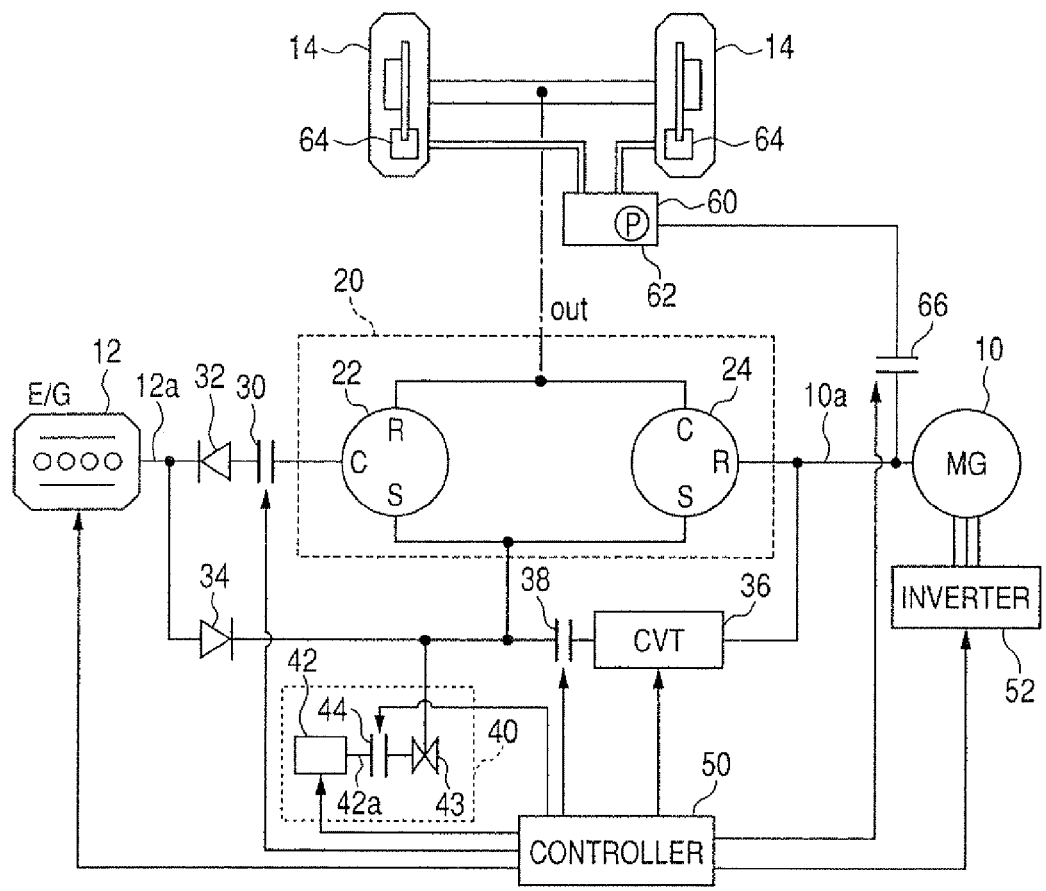
FIG. 11 is a block diagram which illustrates a power transmission device according to the fifth embodiment of the invention.

FIG. 11 illustrates a hybrid system according to the fifth embodiment of the invention which is a combination of the second and fourth embodiments. The same reference numbers as employed in FIG. 1 refer to the same parts, and explanation thereof in detail will be omitted here.

In this embodiment, two accessories which need to be driven by the power split device 20 are the brake pump 62 and the compressor 42. The brake pump 62 is connected mechanically to the ring gear R of the second planetary gear set 24 through the electronically-controlled clutch 66. The compressor 42 is connected mechanically to the sun gears S of the first and second planetary gear sets 22 and 24 and also to the ring gear R of the second planetary gear set 24.

The controller 50 works to supply the power produced by the motor-generator 10 to both the brake pump 62 and the compressor 42. The controller 50 may control the gear ratio of the CVT 36 and the output (i.e., the speed) of the motor-generator 10 based on a priority of which of the brake pump 62 and the compressor 42 the torque should be finely supplied to. For instance, when the priority of finely controlling the supply of power to the compressor 42 is higher than that to the brake pump 62, the controller 50 controls the gear ratio of the CVT 36 and the output (i.e., the speed) of the motor-generator 10 based on the amount of energy to be supplied to the compressor 42.

Figure 12:
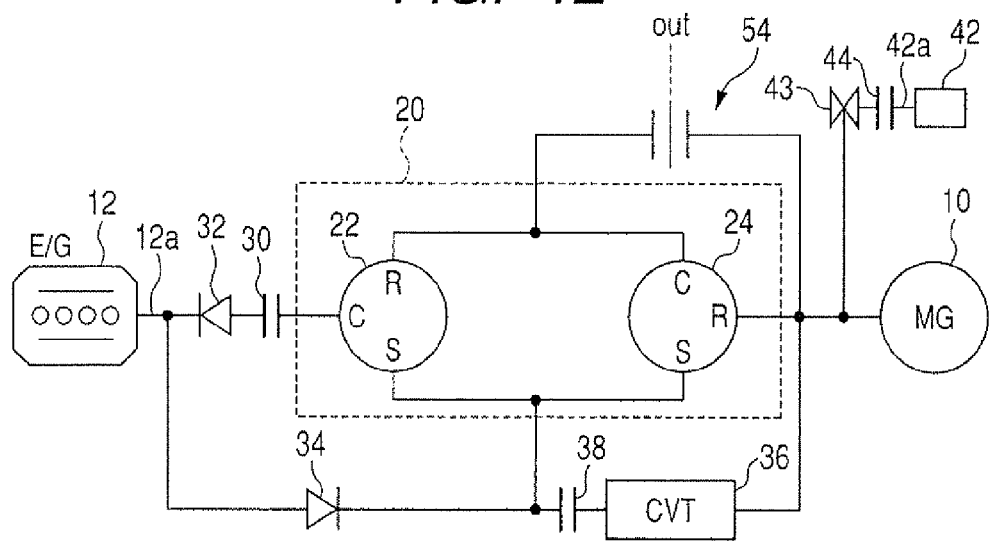
FIG. 12 is a block diagram which illustrates a power transmission device according to the sixth embodiment of the invention.

FIG. 12 illustrates a hybrid system according to the sixth embodiment of the invention. The same reference numbers as employed in FIG. 1 refer to the same parts, and explanation thereof in detail will be omitted here.

The hybrid system of this embodiment is designed to switch between the rotors of the power split device 20 which are to be connected mechanically to the driven wheels 14 of the vehicle. Specifically, the hybrid system, as clearly illustrated in the drawing, includes an electronically controlled clutch 54 which works as a switch or selector to select one of (a) a pair of the ring gear R of the first planetary gear set 22 and the carrier C of the second planetary gear set 24 and (b) the ring gear R of the second planetary gear set 24 which is to be coupled to the driven wheels 14. For the sake of simplicity of illustration, the driven wheels 14 are omitted from FIG. 12. Instead, a path connected mechanically to the driven wheels 14 is expressed by "out".

The use of the clutch 54 enables the motor-generator 10 or the engine 12 to be run in an increased effective operation range. For example, increasing of the speed of the driven wheels 14 coupled to the ring gear R of the first planetary gear set 22 and the carrier C of the second planetary gear set 24 during the operation of the motor-generator 10 requires increasing the speed of the motor-generator 10 above that of the driven wheels 14. The increasing of the speed of the motor-generator 10 up to an inefficient operation range will result in an increase in consumed amount of energy in the hybrid system. In order to alleviate this problem, when the inefficient operation range is entered, the controller 50 connects the driven wheels 14 mechanically to the ring gear R of the second planetary gear set 24, thereby eliminating the need for increasing the speed of the motor-generator 10 above that of the driven wheels 14. Similarly, when the driven wheels 14 are being powered by the internal combustion engine 12, the controller 50 may work to switch between the rotors of the power split device 20 which are to be connected mechanically to the driven wheels 14 in a range where it is difficult to run the engine 12 effectively only through control of the CVT 36 in order to keep the engine 12 running in the effective operation range.

The switching of a first mode in which the driven wheels 14 are coupled to the ring gear R of the first planetary gear set 22 and the carrier C of the second planetary gear set 24 to a second mode in which the driven wheels 14 are coupled to the ring gear R of the second planetary gear set 24 is achieved by operating the clutch 54 to block the transmission of torque from the ring gear R of the first planetary gear set 22 and the carrier C of the second planetary gear set 24 to the driven wheels 14, bringing the speed of the motor-generator 10 to that of the driven wheels 14, and operating the clutch 54 to establish a mechanical connection of the ring gear R of the second planetary gear set 24 to the driven wheels 14. Conversely, the switching of the second mode in which the driven wheels 14 are coupled to the ring gear R of the second planetary gear set 24 to the first mode in which the driven wheels 14 are coupled to the ring gear R of the first planetary gear set 22 and the carrier C of the second planetary gear set 24 is achieved by operating the clutch 54 to block the transmission of torque from the ring gear R of the second planetary gear set 24 to the driven wheels 14, controlling the operation of the motor-generator 10 to bring the speed of the ring gear R of the first planetary gear set 22 and the carrier C of the second planetary gear set 24 to that of the driven wheels 14, and operating the clutch 54 to establish a mechanical connection of the ring gear R of the first planetary gear set 22 and the carrier C of the second planetary gear set 24 to the driven wheels 14.

When the vehicle is at a stop, and it is required to drive the compressor 42, the controller 50 operates the clutch 54 to establish the connection of the driven wheels 14 to the ring gear R of the first planetary gear set 22 and the carrier C of the second planetary gear set 24, thereby permitting the torque output from the motor-generator 10 to the compressor 42 when the vehicle is at a stop. The clutch 54 is preferably designed as a normally closed type which establishes the connection of the ring gear R of the first planetary gear set 22 and the carrier C of the second planetary gear set 24 to the driven wheels 14 when the vehicle is stopped, and the clutch 54 is electrically deenergized.

The structure of the hybrid system of this embodiment also have the following advantage in addition to the advantages (1) to (10), as described above.

11) The hybrid system of this embodiment is equipped with the selector (i.e., the clutch 54) which switches between the rotors of the power split device 20 which are to be connected mechanically to the driven wheels 14 of the vehicle, thereby easing the restrictions on the speed of the motor-generator 10 or the engine 12 when it is required to bring the speed of the driven wheels 14 below a given value, which ensures the operation of the motor-generator 10 or the engine 12 in the effective operation range.

Figure 13:
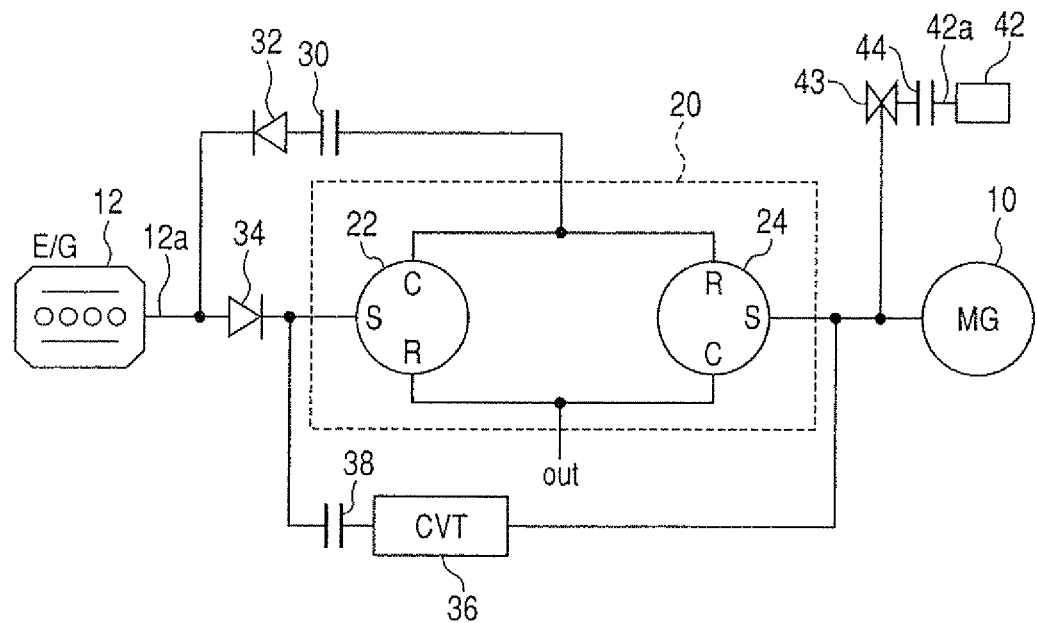
FIG. 13 is a block diagram which illustrates a power transmission device according to the seventh embodiment of the invention.

FIG. 13 illustrates a hybrid system according to the seventh embodiment of the invention. The same reference numbers as employed in FIG. 1 refer to the same parts, and explanation thereof in detail will be omitted here.

The power split device 20 has the first planetary gear set 22 connected mechanically at the carrier C thereof to the ring gear R of the second planetary gear set 24. The carrier C and the ring gear R work as engine starting rotors of the power split device 20 to provide the initial torque (i.e., starting torque) to the engine 12. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 13. Instead, a path connected mechanically to the driven wheels 14 is expressed by "out". The sun gear S of the first planetary gear set 22 is used as the rotor which is connected to the power transmission axis and to which the torque, as produced by the engine 12, is transmitted. The sun gear S of the first planetary gear set 22 is also connected mechanically to the motor-generator 10 through the CVT 36. The motor-generator 10 is also connected mechanically to the sun gear S of the second planetary gear set 24.

The driven shaft 42a of the compressor 42 is coupled mechanically to the sun gear S of the second planetary gear set 24.

The structure of the hybrid system of this embodiment provides substantially the same advantages (1) to (9), as described above.

Figure 14:
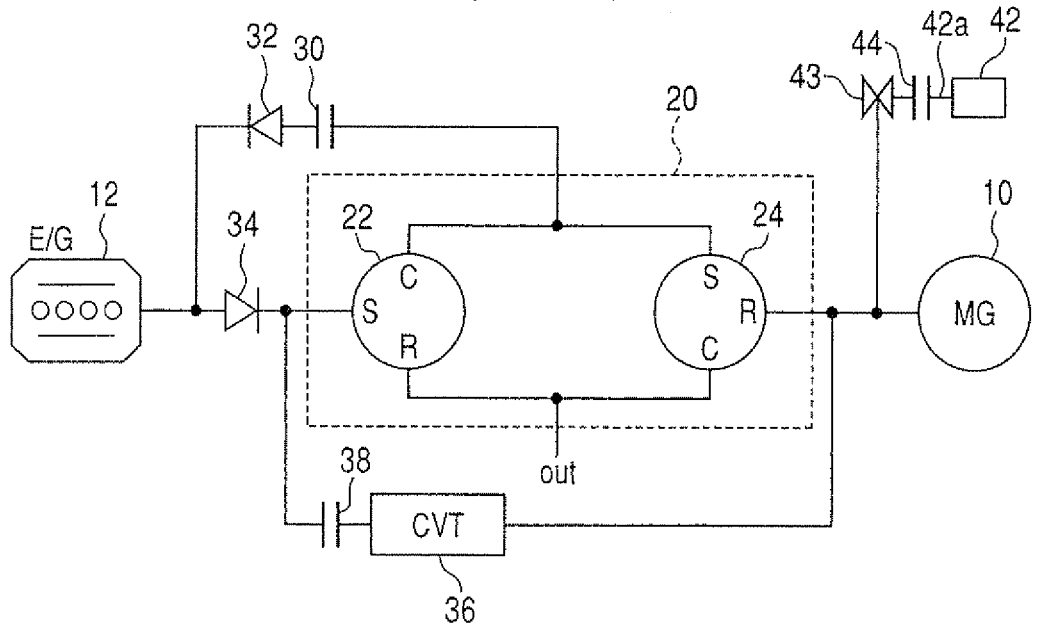
FIG. 14 is a block diagram which illustrates a power transmission device according to the eighth embodiment of the invention.

FIG. 14 illustrates a hybrid system according to the eighth embodiment of the invention. The same reference numbers as employed in FIG. 1 refer to the same parts, and explanation thereof in detail will be omitted here.

The power split device 20 has the first planetary gear set 22 connected mechanically at the carrier C thereof to the sun gear S of the second planetary gear set 24. The carrier C and the sun gear S work as engine starting rotors of the power split device 20 to provide the initial torque to the engine 12. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 14. Like in FIG. 12, the path connected mechanically to the driven wheels 14 is expressed by "out". The sun gear S of the first planetary gear set 22 is used as the rotor which is connected to the power transmission axis and to which the torque, as produced by the engine 12, is transmitted. The sun gear S of the first planetary gear set 22 is also connected mechanically to the motor-generator 10 through the CVT 36. The motor-generator 10 is also connected mechanically to the ring gear R of the second planetary gear set 24.

The driven shaft 42a of the compressor 42 is coupled mechanically to the ring gear R of the second planetary gear set 24.

The structure of the hybrid system of this embodiment provides substantially the same advantages (1) to (9), as described above.

Figure 15:
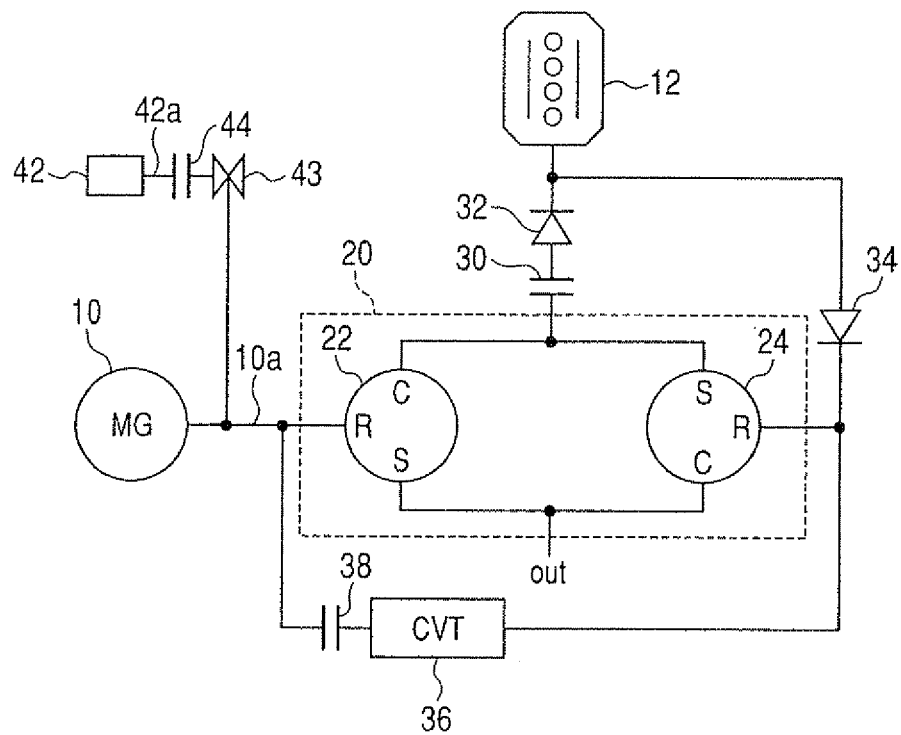
FIG. 15 is a block diagram which illustrates a power transmission device according to the ninth embodiment of the invention.

FIG. 15 illustrate a hybrid system according to the ninth embodiment of the invention. The same reference numbers as employed in FIG. 1 refer to the same parts, and explanation thereof in detail will be omitted here.

The power split device 20 has the first planetary gear set 22 connected mechanically at the carrier C thereof to the sun gear S of the second planetary gear set 24. The carrier C and the sun gear S work as engine starting rotors of the power split device 20 to provide the initial torque to the engine 12. The sun gear S of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 15. Like in FIG. 12, the path connected mechanically to the driven wheels 14 is expressed by "out". The ring gear R of the second planetary gear set 24 is used as the rotor which is connected to the power transmission axis to which the torque, as produced by the engine 12, is transmitted. The ring gear R of the second planetary gear set 24 is also connected mechanically to the motor-generator 10 through the CVT 36. The motor-generator 10 is also connected mechanically at the rotating shaft 10a thereof to the ring gear R of the first planetary gear set 22.

The driven shaft 42a of the compressor 42 is coupled mechanically to the ring gear R of the second planetary gear set 24.

The structure of the hybrid system of this embodiment provides substantially the same advantages (1) to (9), as described above.

Figure 16:
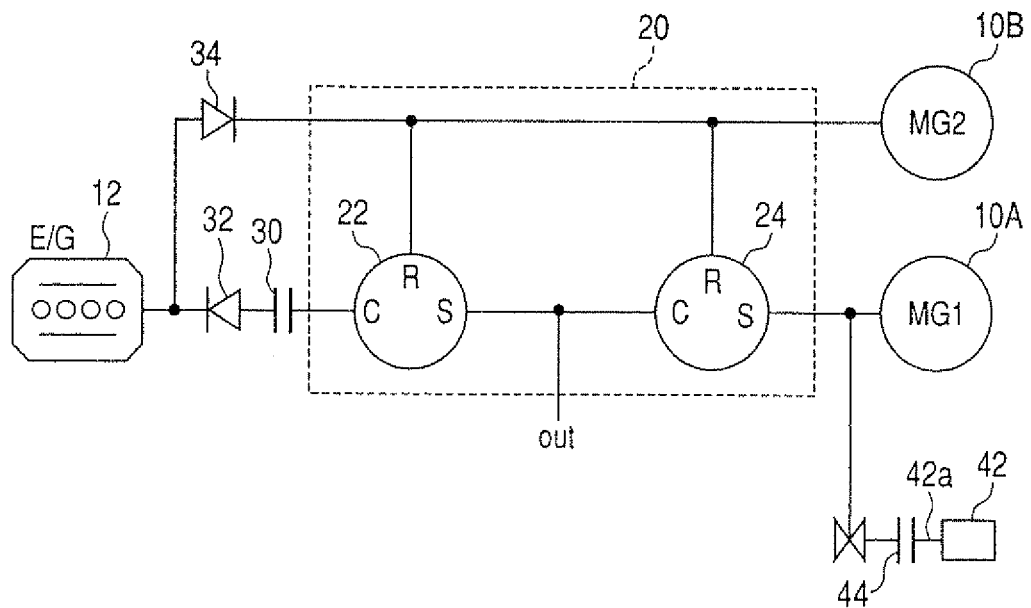
FIG. 16 is a block diagram which illustrates a power transmission device according to the tenth embodiment of the invention.

FIG. 16 illustrates a hybrid system according to the tenth embodiment of the invention. The same reference numbers as employed in FIG. 1 refer to the same parts, and explanation thereof in detail will be omitted here.

The hybrid system, as can be seen from the drawing, does not have the CVT 36, but is equipped with two drive generator-motors 10A and 10B to drive the vehicle.

The power split device 20 has the first planetary gear set 22 connected mechanically at the ring gear R thereof to the ring gear R of the second planetary gear set 24. The ring gears R of the first and second planetary gear sets 22 and 24 are also connected mechanically to the second motor-generator 10B and work as rotors of the power split device 20 to which the torque, as produced by the engine 12, is transmitted through the one-way bearing 34. The sun gear S of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 16. Like in FIG. 12, the path connected mechanically to the driven wheels 14 is expressed by "out". The sun gear S of the second planetary gear set 24 is coupled mechanically to the first motor-generator 10A. The carrier C of the first planetary gear set 22 works as an engine starting rotor of the power split device 20 to provide the initial torque to the engine 12 through the clutch 30 and the one-way bearing 32.

The driven shaft 42a of the compressor 42 is coupled mechanically to the sun gear S of the second planetary gear set 24.

The structure of this embodiment is operable to supply the torque of either of the first motor-generator 10A or the second motor-generator 10B to the compressor 42. Both the motor-generators 10A and 10B do not always necessarily function as a motor-generator. At least either of them may work as the motor-generator. For example, in the case where the first motor-generator 10A is designed to operate as only a generator, the electric energy, as produced by the first motor-generator 10A, is consumed by the second motor-generator 10B working as an electric motor to drive the vehicle. The first motor-generator 10A working as only the generator is used to provide a braking effort when it is required to brake the vehicle and also to control the speeds of the rotors of the power split device 20.

The structure of the hybrid system of this embodiment provides substantially the same advantages (1) to (3), and (5) to (9) as described above.

Figure 17:
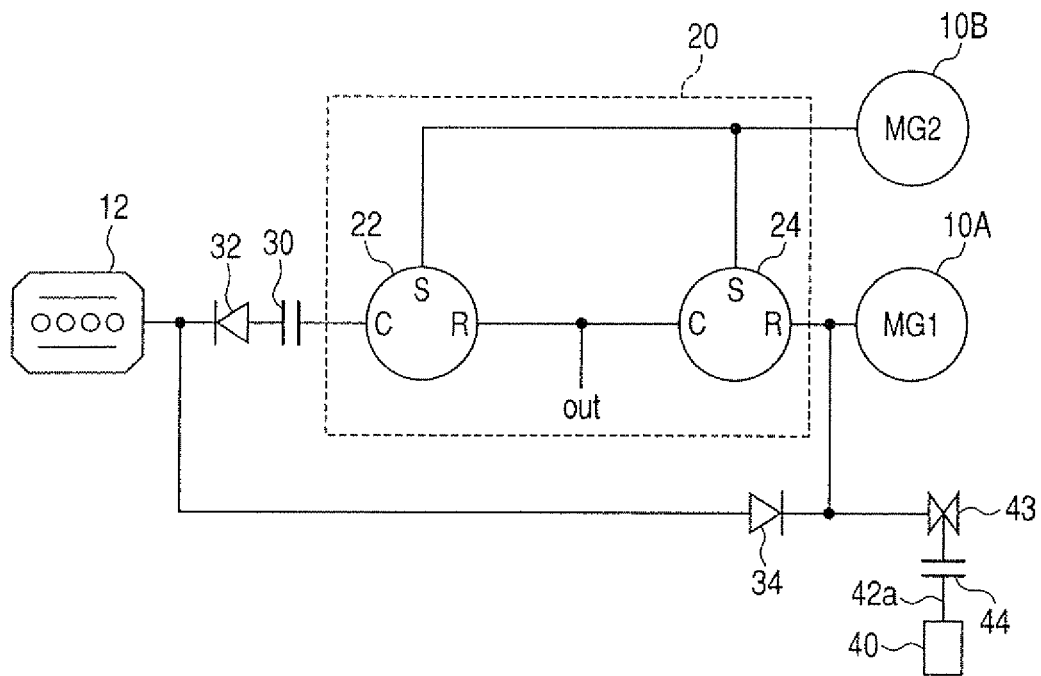
FIG. 17 is a block diagram which illustrates a power transmission device according to the eleventh embodiment of the invention.

FIG. 17 illustrates a hybrid system according to the eleventh embodiment of the invention. The same reference numbers as employed in FIG. 1 refer to the same parts, and explanation thereof in detail will be omitted here.

The hybrid system, like in the tenth embodiment, does not have the CVT 36, but is equipped with two drive generator-motors 10A and 1013 to drive the vehicle.

The power split device 20 has the first planetary gear set 22 connected mechanically at the sun gear S thereof to the sun gear S of the second planetary gear set 24. The sun gears S of the first and second planetary gear sets 22 and 24 are also connected mechanically to the second motor-generator 10B. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 17. Like in FIG. 12, the path connected mechanically to the driven wheels 14 is expressed by "out". The ring gear R of the second planetary gear set 24 is coupled mechanically to the first motor-generator 10A and works as the rotor of the power split device 20 to which the torque of the engine 12 is transmitted through the one-way bearing 34. The carrier C of the first planetary gear set 22 works as the engine starting rotor to provide the initial torque to the engine 12.

The ring gear R of the second planetary gear set 24 is connected mechanically to the compressor 42. When it is required to drive the compressor 42, the torque of the ring gear R of the second planetary gear set 24 or the torque of the carrier C of the first planetary gear set 22 is transmitted to the driven shaft 42a of the compressor 42.

The structure of the hybrid system of this embodiment provides substantially the same advantages (1) to (3), and (5) to (9) as described above.

Figure 18:
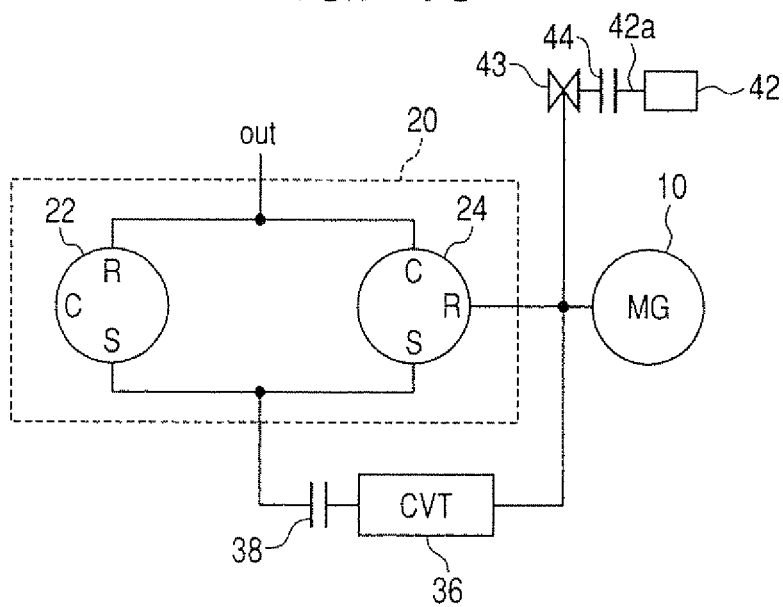
FIG. 18 is a block diagram which illustrates a power transmission device according to the twelfth embodiment of the invention.

FIG. 18 illustrates a power transmission device according to the twelfth embodiment of the invention. The power transmission device of this embodiment is installed in a so-called electric vehicle which does not have the internal combustion engine 12 and is equipped only with the generator-motor 10. The same reference numbers as employed in FIG. 1 refer to the same parts, and explanation thereof in detail will be omitted here.

As can be seen from the drawing, the power split device 20 is identical in structure with the one in the first embodiment. The compressor 42 is connected to the motor-generator 10 in the same manner as in the first embodiment.

Figure 19:
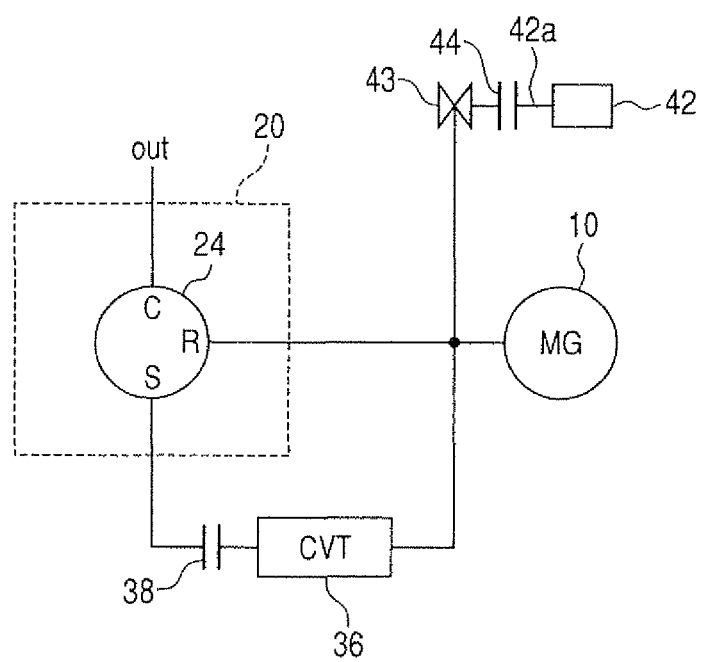
FIG. 19 is a block diagram which illustrates a power transmission device according to the thirteenth embodiment of the invention.

FIG. 19 illustrates a power transmission device according to the thirteenth embodiment of the invention. The power transmission device of this embodiment is, like in the twelfth embodiment, installed in a so-called electric vehicle which does not have the internal combustion engine 12 and is equipped only with the generator-motor 10. The same reference numbers as employed in FIG. 1 refer to the same parts, and explanation thereof in detail will be omitted here.

As can be seen from the drawing, the power split device 20 is equipped with a single planetary gear set which is connected at a carrier C thereof to the driven wheels 14. For the sake of simplicity of illustration, the driven wheels 14 are omitted from FIG. 19. Like in FIG. 12, the path connected mechanically to the driven wheels 14 is expressed by "out". The ring gear R and the sun gear S of the planetary gear set are connected mechanically to the motor-generator 10. The CVT 36 and the clutch 38 are disposed between the sun gear S and the motor-generator 10.

The driven shaft 42a of the compressor 42 is connected mechanically to the ring gear R of the planetary gear set. The torque of the ring gear R or the sun gear S is transmitted to the driven shaft 42a of the compressor 42.

The above first to thirteenth embodiments may be modified as discussed below.

The rotor(s) of the power split device 20 which is connected mechanically to the accessory mounted in the vehicle is not limited to that as described above. Basically, the rotor(s) of the power split device 20 other than one(s) connected mechanically to the driven wheels when the vehicle is at a stop may be joined to the accessory.

In the first to third and sixth to thirteenth embodiments, the accessory to be driven by the power split device 20 may be the brake pump 62 instead of the compressor 42.

The fourth to ninth and twelfth to thirteenth embodiments may be modified, like in the third embodiment, as illustrated in FIG. 8, in which the compressor 42 is joined between the clutch 38 and the CVT 36.

In the fifth embodiment, the compressor 42 is replaced in a relation of connection to the power split device 20 with the brake pump 62.

In the first to ninth and twelfth to thirteenth embodiments, a maximum energy required by the accessory is 50% of a maximum required output of the motor-generator 10, but it may be set to another percentage. It is, however, advisable that a maximum value of output of the motor-generator 10 required by the accessory (in the case where there are a plurality of accessories to be driven by the power split device 20, a maximum value of the sum of outputs of the motor-generator 10 required by all the accessories) be not much smaller than the maximum output of the motor-generator 10. Therefore, the maximum energy required by the motor-generator 10 is preferably 25% or more, more preferably 35% or more of the maximum required output of the motor-generator 10.

The above percentage is also desirable in the tenth and eleventh embodiments. Therefore, in the tenth or eleventh embodiment, a CVT may be disposed between the first motor-generator 10A or the second motor-generator 10B and the power split device 20 or between the power split device 20 and the driven wheels 14 to permit the gear ratio thereof required to start the vehicle to be selected to be a very low speed value. This enables the torque which can be applied to the driven wheels 14 to be increased without having to increase the size of the first motor-generator 10A or the second motor-generator 10B.

In the third embodiment, the compressor 42 may be disposed between a joint of the sun gears S of the first and second planetary gear sets 22 and 24 and the clutch 38. When the vehicle is at a stop, the controller 50 disengages the clutch 38 to block the connection between the motor-generator 10 and the compressor 42. The controller 50 places the speeds of the ring gear R of the first planetary gear set 22 and the carrier C of the second planetary gear set 24 at zero (0) and controls the speed of the motor-generator 10 to regulate the speeds of the sun gears S of the first and second planetary gear sets 22 and 24 to a selected value, thereby bringing the speed of the driven shaft 42a of the compressor 42 to a target value.

In the first to ninth embodiments, the CVT 36 is exchanged in location with the clutch 38. For example, in the first embodiment, the clutch 38 may be disposed closer to the rotating shaft 10a of the motor-generator 10 than the CVT 36, while the CVT 36 may be disposed closer to the sun gears S of the first and second planetary gear sets 22 and 24.

In the first to eleventh embodiments, the clutch 30 is disposed closer to the starting axis of the power split device 20, and the one-way bearing 32 is disposed closer to the rotating shaft 12a of the engine 12, but they may be disposed vice versa. Further, clutches may also be disposed on both sides of the one-way bearing 32.

The manner in which the torque is transmitted from the rotor(s) of the power split device 20 to the accessory is not limited to the one described above. For instance, a driven shaft of the accessory may be pressed mechanically against a belt of the CVT 36 to transmit the torque from the CVT 36 to the accessory. For instance, in the first embodiment in FIG. 1, the sun gears S of the first and second planetary gear sets 22 and 24, and the ring gear R of the second planetary gear set 24 are connected mechanically to the accessory through the belt of the CVT 36. In other words, the torque is transmitted from the sun gears S of the first and second planetary gear sets 22 and 24 of the ring gear R of the second planetary gear set 24.

In the first to eleventh embodiments, the clutch 30 is disposed to block the path through which the torque is transmitted from the power split device 20 to the rotating shaft 12a of the engine 12 when it is required to start the engine 12, but however, it may be omitted. When the vehicle is at a stop, the rotating energy of one(s) of the rotors of the power split device 20 may be used to drive the accessory.

The one-way bearing 32 is disposed between the power split device 20 and the engine 12 to establish the transmission of power to the engine 12 when the speed of the starting axis (i.e., a power input side of the one-way bearing 32) of the power split device 20 is greater than or equal to that of the rotating shaft 12a (i.e., a power output side of the one-way bearing 32) of the engine 12, however, a one-way clutch or another similar type working to have the rotating shaft 12a follow the rotation of the starting axis of the power split device 20 with or without slip may be used.

The one-way bearing 32 working to establish the transmission of torque from the starting axis of the power split device 20 to the rotating shaft 12a of the engine 12 under the condition that the speed of the starting axis of the power split device 20 relative to the rotating shaft 12a of the engine 12 is not zero (0) may be omitted. For example, only the clutch 30 may be disposed between the rotating shaft 12a and the starting axis of the power split device 20. After the engine 12 is started up, the controller 50 disengages the clutch 30 to block the connection between the engine 12 and the power split device 20, thereby establishing only the mechanical connection between the rotors (i.e., the sun gears S) of the power split device 20 which are higher in speed than the starting axis (i.e., the carrier C of the first planetary gear set 22) of the power split device 20 and the engine 12.

The one-way bearing 34 is disposed between the power split device 20 and the engine 12 to establish the transmission of power from the engine 12 to the power transmission axis of the power split device 20 when the speed of the rotating shaft 12a (i.e., a power input side of the one-way bearing 34) of the engine 12 is greater than or equal to that of the power transmission axis (i.e., a power output side of the one-way bearing 334) of the power split device 20, however a one-way clutch or another similar type working to have the power transmission axis follow the rotation of the rotating shaft 12a of the engine 12 with or without slip may be used.

The one-way bearing 34 may be replaced with a clutch similar in structure to the clutch 30. In this case, the controller 50 engages the clutch when the speed of the engine 12 is equal to that of the power transmission axis of the power split device 20 to ensure the stability in connecting the rotating shaft 12a of the engine 12 and the power transmission axis.

The power transmission axis of the power split device 20 in the first embodiment is the shaft connecting with the sun gears S of the first and second planetary gear sets 22 and 24, however, may alternatively be the shaft connecting with the ring gear R of the second planetary gear set 24. Similarly, in the second to ninth embodiments, the power transmission axis may be the shaft connecting mechanically with the rotating shaft 10a of the motor-generator 10. Further, in the first to ninth embodiments, the power transmission axis may be joined to the rotating shaft 10a of the motor-generator 10 without use of the CVT 36. Specifically, in FIG. 1, a shaft which rotates together with the sun gears S of the first and second planetary gear sets 22 and 24 and the rotating shaft 10a of the motor-generator 10 may be implemented by a single shaft. Alternatively, the motor-generator 10 may also be connected mechanically to one of shafts of the CVT 36 which is closer to the clutch 38.

The structure of the sixth embodiment equipped with the clutch 54 may be used with that of each of the second to fifth and seventh to thirteenth embodiments. In this case, the rotor(s) of the power split device 20 which is to be connected mechanically to the driven wheels 14 needs not always be identical in sign of the rotational speed with the driven wheels 14 in the nomographic chart. The use of a directional control mechanism working to change the direction of rotation of the rotor(s) permits the power transmission path which is to be connected from the power split device 20 to the driven wheels 14 to be switched selectively.

Further, one(s) of the rotors of the power split device 20 which is to be connected selectively by the clutch 54 to the driven wheels 14 may not be connected mechanically to the rotating shaft 10a of the motor-generator 10 without through the CVT 36. For instance, in FIG. 1, the connection to the driven wheels 14 may be switched between a combination of the ring gear R of the first planetary gear set 22 and the carrier C of the second planetary gear set 24 and a combination of the sun gear S of the first planetary gear set 22 and the sun gear S of the second planetary gear set 24.

The first and second planetary gear sets 22 and 24 of the power split device 20 may alternatively be designed to have structures different from those described in the above embodiments. The first and second planetary gear sets 22 and 24 is preferably so designed that any two of the three rotors (i.e., the sun gear S, the carrier C, and the ring gear R) of the first planetary gear set 22 are coupled mechanically to any two of the three rotors (i.e., the sun gear S, the carrier C, and the ring gear R) of the second planetary gear set 24. FIGS. 20(a) to 20(j) and FIGS. 21(a) to 21(j) are nomographic charts illustrating possible modifications of the first and second planetary gear sets 22 and 24. Each of the nomographic charts represents a relation in connection between a total of six rotors of the first and second planetary gear sets 22 and 24 and a relation between four different speeds arraying straight in the nomographic chart and the six rotors of the first and second planetary gear sets 22 and 24. Note that the ratio of the number of teeth of the run gear S to that of the ring gear R is, however, indicated schematically for the sake of convenience.

In each of the nomographic charts, the sun gear S, the carrier C, and the ring gear R of the first planetary gear set 22 are illustrated on the upper side. For example, in FIGS. 20(b) and 20(c), the ring gears R of the first and second planetary gear sets 22 and 24 are connected mechanically to each other. The carriers C of the first and second planetary gear sets 22 and 14 are connected mechanically to each other. Which of the ratio of the number of teeth of the run gear S to that of the ring gear R of the first planetary gear set 22 and that of the second planetary gear set 24 is greater is represented by lateral locations of vertical lines indicating the sun gears S. The same advantages, as described in the first embodiment, may be obtained by connecting the motor-generator 10 to the rotor of the power split device 20 which lies in speed at the right or left end in the nomographic chart, and connecting the rotors having intermediate speeds to the starting axis for the engine 12 and the driven wheels 14, respectively from the left in the nomographic chart.

The first and second planetary gear sets 22 and 24 of the power split device 20 may alternatively be designed not to have the structure in which any two of the three rotors of the first planetary gear set 22 are coupled mechanically to any two of the three rotors of the second planetary gear set 24. For instance, each of the three rotors of the first planetary gear set 22 may be coupled mechanically to one of the three rotors of the second planetary gear set 24. In this case, the supply of power to the accessory and the driven wheels 14 may be achieved by connecting the driven wheels 14 to one of pairs of the coupled rotors of the first and second planetary gear sets 22 and 24 and also connecting the other four rotors to the engine 12 and the motor-generator 10, respectively. Specifically, the engine 12 is joined mechanically to one of the four other rotors. The motor-generator 10 is joined mechanically directly to one of the three other rotors and also joined to one of the two other rotors through the CVT 36. Alternatively, some of the six rotors of the first and second planetary gear sets 22 and 24 may be fixed. In this case, the speeds of the rotors in the nomographic chart do not lie on the straight line, but they are defined by two lines intersecting with each other at a single point.

The power split device 20 to be installed in the hybrid vehicle may alternatively be designed to have a single planetary gear set, that is, either of the first and second planetary gear sets 22 and 24. For instance, the power split device 20 may be equipped with a single planetary gear set and two motor-generators: first and second motor-generators. The first motor-generator is connected mechanically to the sun gear of the planetary gear set. The second motor-generator is connected mechanically to the ring gear of the planetary gear set. The carrier of the planetary gear set is connected mechanically to the engine 12. One of the sun gear or the carrier is connected to the accessory. The supply of torque from the power split device 20 to drive the accessory when the vehicle is at a stop is achieved by holding the driven wheels 14 from rotating through a brake actuator. The clutch 30 is preferably used to block the mechanical connection between the engine 12 and the carrier of the planetary gear set. In the case where the speed of either of the sun gear or the carrier is zero (0), and it is required to drive the accessory, the torque may be supplied from the other of the sun gear and the carriers to the accessory. This may be achieved by connecting one-way power transmission devices such as one-way clutches to the sun gear and the carriers, respectively, so that when the speed of each of the sun gear and the carrier is greater than zero (0), the torque may be transmitted therefrom to the accessory.

The power split device 20 may also be designed to have the structure, as taught in the first to third publications already referred to in the introductory part of this application. In this case, the restrictions on the control of speed of the accessory may be eased by designing the power split device 20 so as to supply the torque from the rotor(s) other than one(s) connected mechanically to the driven wheels 14 to the accessory. The transmission of torque to the accessory when the vehicle is at a stop may be accomplished by connecting the accessory to the rotor(s) which is other than one(s) connected mechanically to the driven wheels 14 and whose speed will not be zero (0) when the vehicle is stopped.

The compressor 42 may alternatively be of a type designed to discharge a fixed amount of fluid.

The clutch 44 and/or the clutch 66 which establish or block the transmission of torque between the power split device 20 and the accessory may be omitted. Even if they are omitted, the rotating energy is enabled to be transmitted to the accessory.

The power transmission device may also be equipped with a one-way power transmission mechanism such as a one-way clutch which establishes a mechanical connection between the rotor of the power split device 20 and the accessory only when the speed of the rotor of the power split device 20 is not smaller than that of the driven shaft of the accessory.

The in-vehicle accessory is not limited to the one, as referred to in the above embodiments. For instance, a fuel pump for the engine 12, an oil pump which supplies lubricant oil to the transmission, a water pump which circulates cooling water to cool the engine 12, an air charging device which pressurizes and charges fresh air into a combustion chamber of the engine 12, or an air pump which supplies air to an exhaust pipe of the engine 12 may be selected as the accessory required to be driven by the power split device 20. One or a plurality of accessories may be coupled mechanically to one of the rotors of the power split device 20. Alternatively, the power split device 20 may also be designed to have the three rotors each of which is coupled to one of the three or more accessories. If the accessory, such as the air pump or the air charging device, which is not required to be driven when the vehicle is at a stop is used, the controller 50 may not supply the power to it when the vehicle is at a stop.

The CVT 36 disposed between the motor-generator 10 and the rotors of the power split device 20 which lie in speed thereof straight in the nomographic chart needs not be of a belt-type. For example, a traction drive type or hydraulic continuously variable transmission may be used. Alternatively, a gear transmission may be used instead of the CVT 36. These types of transmission needs not always be disposed between the motor-generator 10 and the rotors of the power split device 20 which lie at one of ends in the nomographic chart defining the speeds of the rotors of the power split device 20.

The mechanical connections of the driven wheels 14, the engine 12, the motor-generator 10 to the power split device 20 may alternatively be achieved in some way different from those as described above. For instance, a speed reducer such as a speed reduction gear set or a counter gear may be disposed between the power spilt device 20 and the driven wheels 14. The use of the counter gear depending upon specifications of the engine 12 such as the direction of rotation thereof will ensure the desired distribution of power to the driven wheels 14. The mechanical connection of the driven wheels 14 to the power split device 20 may also be achieved using a chain or a belt instead of a rigid gear mechanism.

Similarly, a counter gear may also be disposed between the engine 12 and the power transmission axis or the starting axis of the power split device 20. A speed increasing mechanism such as a speed increasing gear set or a speed reducer such as a speed reduction gear set may also be disposed in a mechanical connection between the motor-generator 10 and the power split device 20. Further, the mechanical connection between the engine 12 and the power split device 20 may be achieved by a chain or a belt as well as a rigid gear(s).

The speed increasing mechanism or the speed reducer may also be disposed in the mechanical connection between the motor-generator 10 and the power split device 20 without through the CVT 36. The mechanical connection of the motor-generator 10 to the sun gears S through the CVT 36 and to the ring gear R is not limited to the one, as illustrated in FIG. 1(b), in which the counter gear CN is disposed in a joint between the motor generator 10 and the ring gear R of the second planetary gear set 24. For instance, a rotary reversing mechanism such as a counter gear may also be disposed between the CVT 36 and the sun gears S of the first and second planetary gear sets 22 and 24. This is achieved under the condition that the speed of the carrier C can be zero (0) when the speeds of the sun gear S and the ring gear R are opposite in sign to each other, however, may also be achieved under the condition that the speed of the carrier C can be zero (0) when the speeds of the sun gear S and the ring gear R are the same in sign. For example, it may be realized by using a so-called double planetary gear set, as taught in Japanese Patent First Publication No. 2001-108073. The mechanical connection of the motor-generator 10 to the power split device 20 without the CVT 36 may also be achieved using a chain or a belt as well as a rigid gear mechanism.

The power transmission device in the above embodiments may be equipped with three or more generator-motors.

The electric rotating machine may alternatively be implemented by a DC motor with brushes, a brushless DC motor, or an induction motor instead of the three-phase AC motor. In this case, a power converter which supplies the power to the electric rotating machine needs be changed. In the case of use of the DC motor with brushes, it is preferably installed externally on the outer wall of an oil-filled casing of the power spit device 20. This is because contacts of the DC motor with brushes may fail to make an electric connection due to the oil. In the case of use of a brushless DC motor, it is preferably installed in the casing of the power split device 20. This is because the motor is cooled by the oil. In the case where the CVT 36 of a wet type is used in the first to sixth embodiments, the CVT 36 is preferably installed in the casing. Therefore, in the case where the motor-generator 10 is disposed outside the casing, the rotating shaft 10a is, as illustrated in FIG. 1(b), joined preferably to the counter gear CN. The motor-generator 10 may alternatively be installed inside the casing and joined at the rotating shaft 10a to the counter gear CN.

The hybrid system of each of the embodiments may alternatively be designed to have two or more internal combustion engines.

Figure 22A:
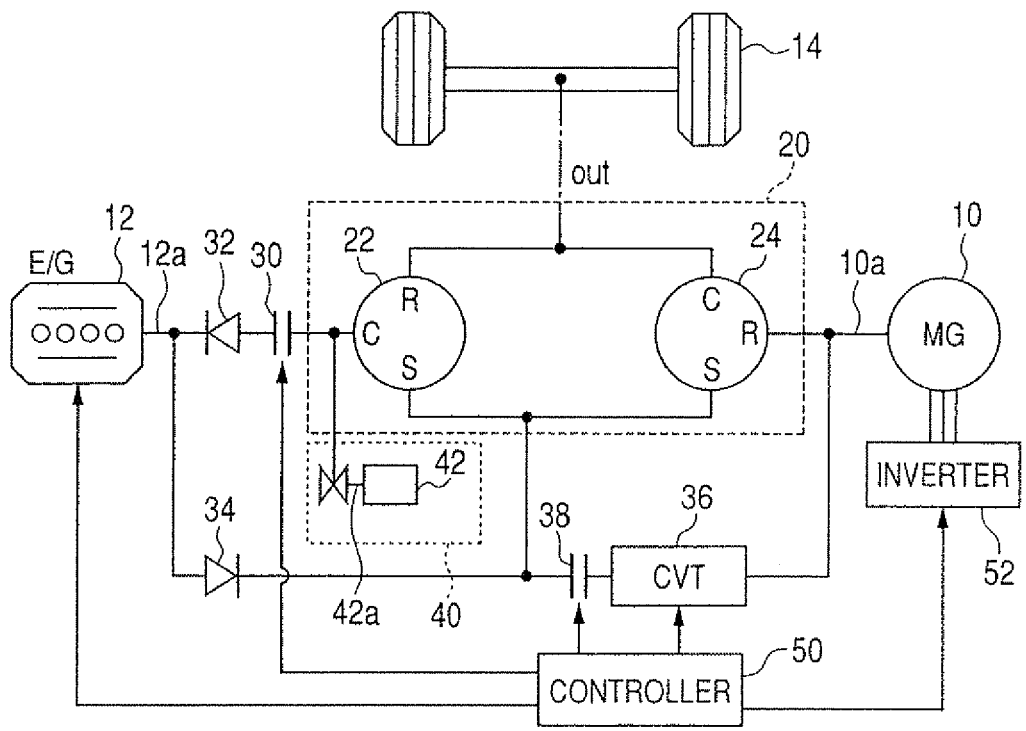
FIG. 22(a) is a block diagram which illustrates a hybrid system for a vehicle in which a power transmission device according to the fourteenth embodiment of the invention is installed.
Figure 22B:
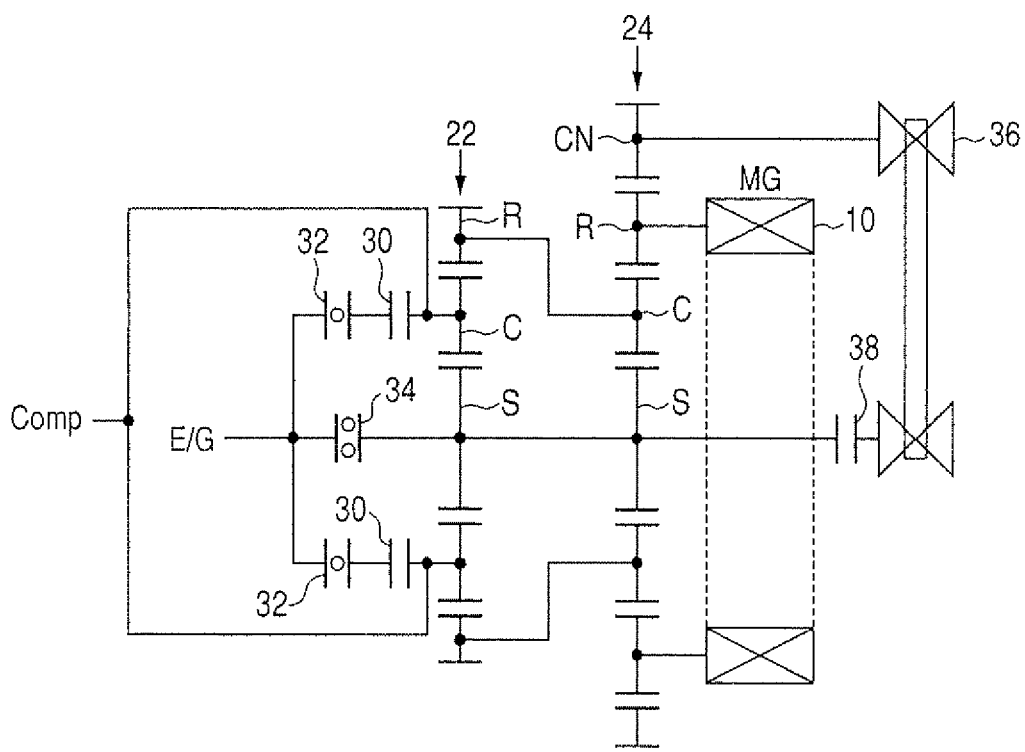
FIG. 22(b) is a skeleton view of power transmission paths of the power transmission device of FIG. 22(a)

FIGS. 22(a) and 22(b) illustrate a hybrid system according to the fourteenth embodiment of the invention. The same reference numbers as employed in the above embodiment refer to the same parts, and explanation thereof in detail will be omitted here.

FIG. 22(a) illustrates the structure of the hybrid system. FIG. 22(b) is a skeleton view of power transmission paths.

The in-vehicle air conditioner 40 is connected mechanically to the carrier C of the first planetary gear set 22. Specifically, the air conditioner 40 is equipped with a compressor 42. The compressor 42 has a driven shaft 42a coupled mechanically between the carrier C of the first planetary gear set 22 and the clutch 30. This coupling may be achieved by connecting the rotor of the first planetary gear set 22 (i.e., the carrier C) to the driven shaft 42a through a pulley. The compressor 42 is of a variable displacement type.

The hybrid system also includes a controller 50 to control an operation of the power transmission device. The controller 50 works to actuate the clutches 30 and 38 to control the operation of the power transmission device and determine a controlled variable for the engine 12. The controller 50 also works to control an operation of an inverter 52 to determine a controlled variable for the motor-generator 10 and also control a discharge capacity or a supply of energy of the compressor 42.

Figure 23A:
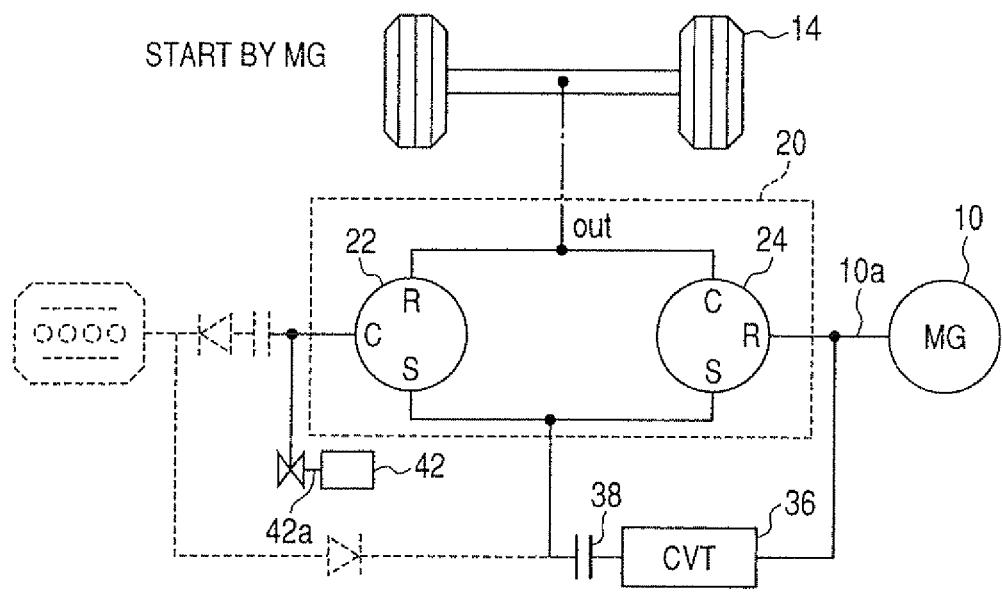
FIG. 23(a) is a schematic block diagram which shows a power transmission path when a vehicle is started by a motor-generator in the fourteenth embodiment.
Figure 23B:
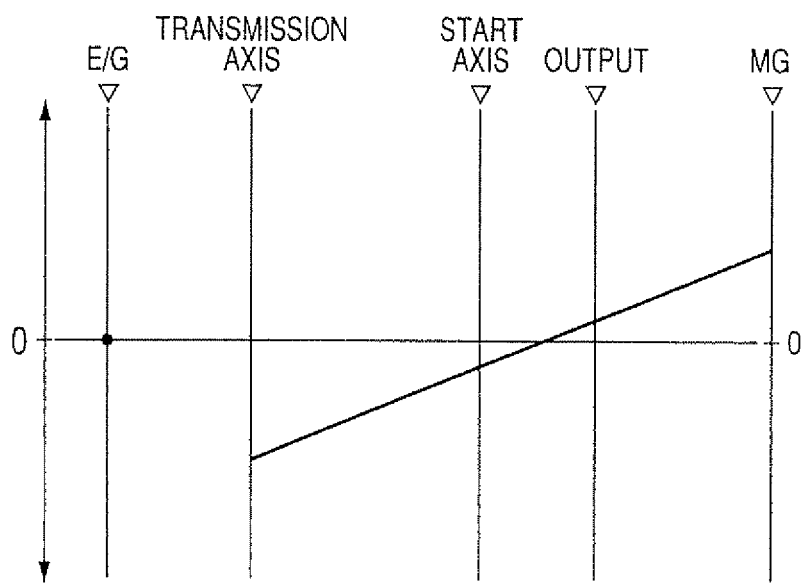
FIG. 23(b) is a nomographic chart which represents an operation of a power split device of the power transmission device of FIGS. 22(a) and 22(b) along with the speed of an internal combustion engine.
Figure 24A:
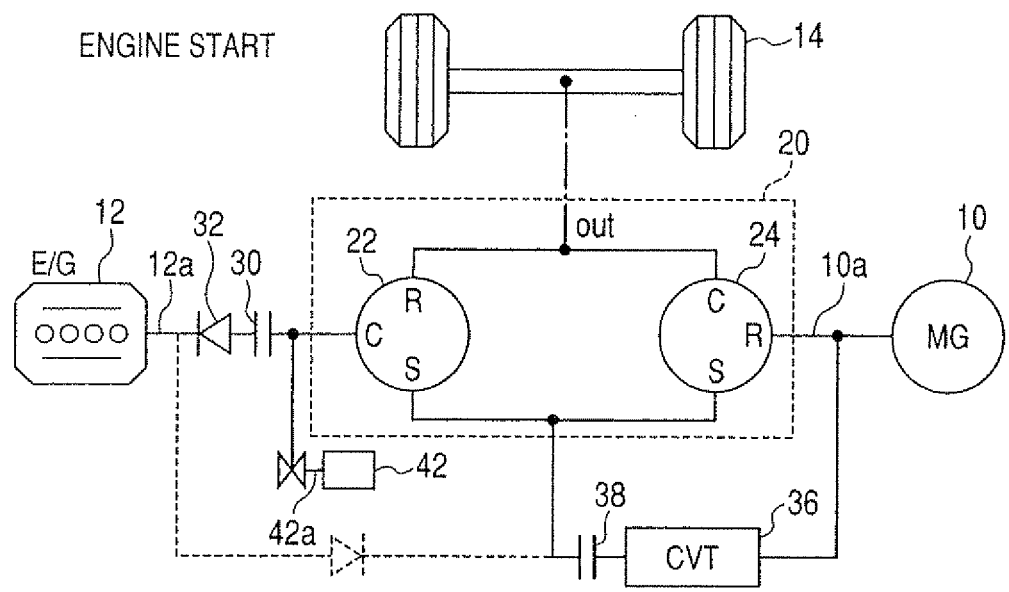
FIG. 24(a) is a schematic block diagram which shows a power transmission path when an internal combustion engine is started by a power split device of FIGS. 22(a) and 22(b)
Figure 24B:
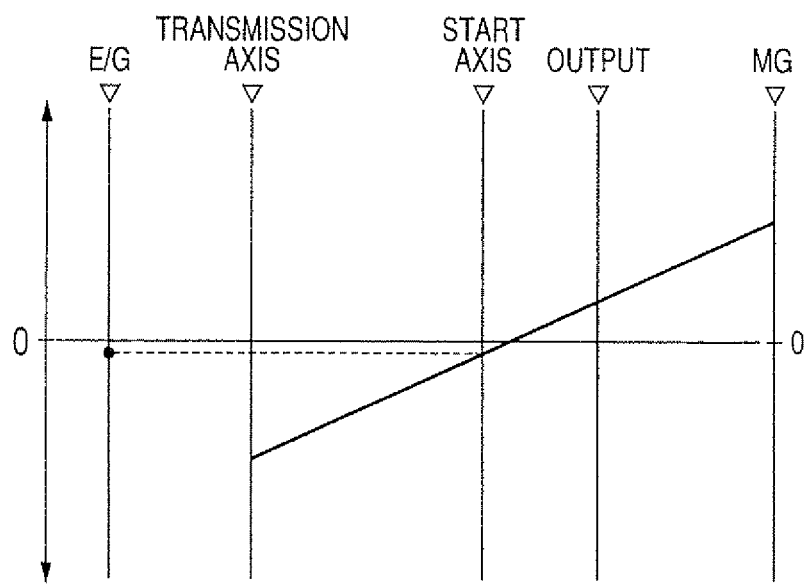
FIG. 24(b) is a nomographic chart which represents an operation of a power split device along with the speed of an internal combustion engine in the fourteenth embodiment.
Figure 25A:
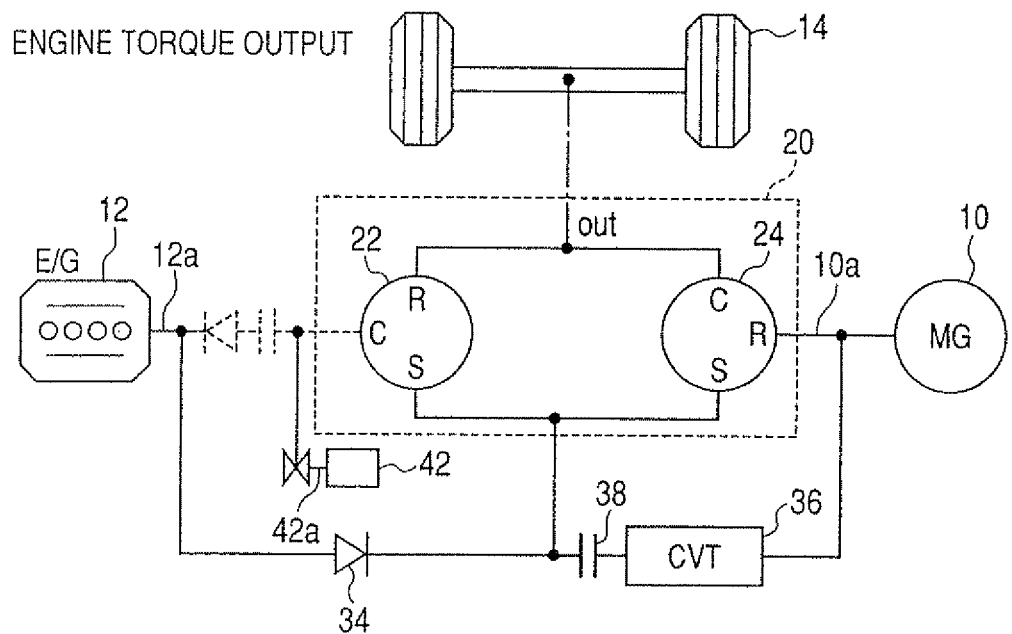
FIG. 25(a) is a schematic block diagram which shows a power transmission path when an internal combustion engine outputs torque to a power split device of FIGS. 22(a) and 22(b)
Figure 25B:
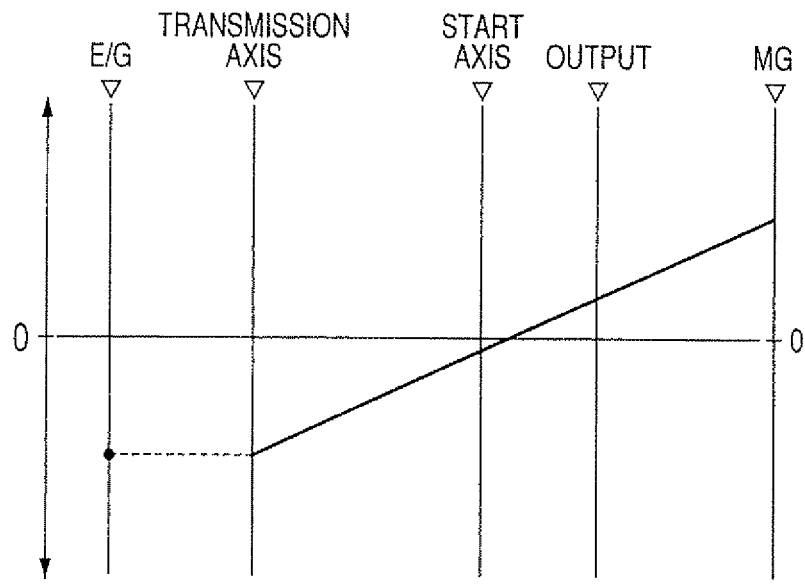
FIG. 25(b) is a nomographic chart which represents an operation of a power split device along with the speed of an internal combustion engine in the fourteenth embodiment.

Next, a compressor drive energy supply control task to control a supply of energy to drive the compressor 42 which is to be executed by the controller 50 will be described below. Note that a vehicle starting task to start the vehicle, an engine starting tasks to start the engine 12, and a vehicle running control task to control running of the hybrid system of this embodiment are, as illustrated in FIGS. 23(a) to 25(b), substantially the same as described in the first embodiment, and explanation thereof in detail will be omitted here. FIG. 23(a) illustrates a power transmission path when the vehicle is started. FIG. 23(b) is a nomographic chart which represents the operation of the power split device 20 along with the speed of the engine 12. FIGS. 24(a) and 24(b) show an operation of the power transmission device to start the engine 12. FIG. 24(a) illustrates a power transmission path when the engine 12 is started. FIG. 24(b) is a nomographic chart which represents the operation of the power split device 20 along with the speed of the engine 12. FIGS. 25(a) and 25(b) show an operation of the power transmission device after the engine 12 is started up. FIG. 25(a) illustrates a power transmission path through which the torque, as outputted from the engine 12 is transmitted. FIG. 25(b) is a nomographic chart which represents the operation of the power split device 20 along with the speed of the engine 12.

Compressor Drive Energy Supply Control

The compressor 42, as described above, has the driven shaft 42a connected mechanically to the carrier C of the first planetary gear set 22. The carrier C of the first planetary gear set 22, therefore, serves as a power source for the compressor 42. The controller 50 monitors a required energy of the compressor 42 to regulate the gear ratio of the CVT 36 or an output of the motor-generator 10 to control the amount of power to be supplied to drive the compressor 42.

Figure 26:
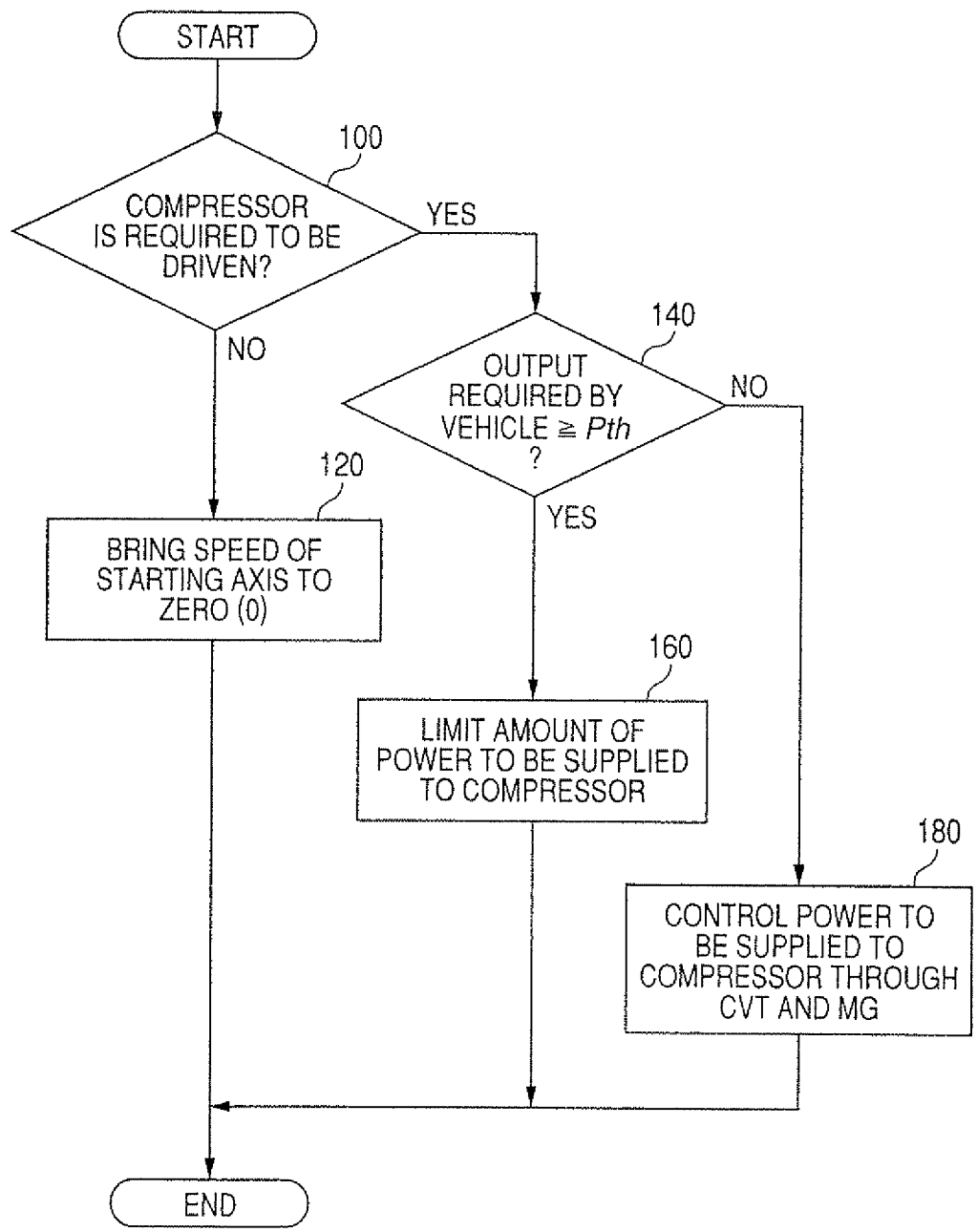
FIG. 26 is a flowchart of a power supply tasks to supply power to an accessory mounted in a vehicle which is to be executed by the power transmission apparatus of FIGS. 22(a) and 22(b)

FIG. 26 is a flowchart of a sequence of logical steps or program to be executed by the controller 50 at a given time interval to control the amount of power to be supplied to the compressor 42.

After entering the program, the routine proceeds to step 100 wherein it is determined whether there is a request to drive the compressor 42 or not. If a NO answer is obtained, then the routine proceeds to step 120 wherein the controller 50 controls the gear ratio of the CVT 36 and an output of the motor-generator 10 to bring the speed of the carrier C of the first planetary gear set 22 to zero (0).

Alternatively, of a YES answer is obtained in step 100, then the routine proceeds to step 140 wherein it is determined whether the power required to be outputted from the motor-generator 10 to run the vehicle is more than or equal to a given threshold value Pth or not. This determination is made to determine whether the priority should be given to the use of power outputted by the motor-generator 10 to run the vehicle over that to drive the compressor 42 or not. Note that the threshold value Pth is set to an output of the motor-generator 10 which is expected not to satisfy a requirement to run the vehicle due to the degree of a request from the compressor 42. If a YES answer is obtained in step 140, then the routine proceeds to step 160 wherein the amount of energy or torque to be supplied to the compressor 42 is restricted. This may be achieved by regulating the gear ratio of the CVT 36 and/or an output of the motor-generator 10 to limit the speed of the carrier C of the first planetary gear set 22 to below a given value.

Alternatively, of a NO answer is obtained in step 140, then the routine proceeds to step 180 wherein the controller 50 regulates the gear ratio of the CVT 36 and/or an output of the motor-generator 10 to supply a required amount of energy to the compressor 42, that is, bring the speed of the compressor 42 into agreement with a required value.

After completion of the operation in step 120, 160, or 180, the routine terminates.

In the above sequence of operations, when the vehicle is at a stop, the controller 50 sets a relation between the gear ratio of the CVT 36 and the speed of the motor-generator 10 so as to keep the speed of the ring gear R of the first planetary gear set 22 and the carrier C of the second planetary gear set 24 which are joined mechanically to the driven wheels 14 at zero (0). When the engine 12 is at rest, the controller 50 disengages the clutch 30 to avoid the consumption of energy produced by the motor-generator 10 arising from the rotation of the rotating shaft 12a of the engine 12.

As apparent from the above discussion, the hybrid system of this embodiment is capable of controlling the gear ratio of the CVT 36 and/or an output of the motor-generator 10 to bring the discharged capacity of the compressor 42 to zero or more even when the compressor 42 is of a fixed discharge capacity type, and the driven wheels 14 are at a stop.

When a required output of the motor-generator 10 becomes great depending upon the degree of required traveling performance of the vehicle, the output of the motor-generator 10 may be used mainly to run the vehicle by limiting or decreasing the amount of energy to drive the compressor 42. Specifically, even when a maximum amount of power required to be outputted by the motor-generator 10 to the compressor 42, as illustrated in FIG. 6(a), occupies almost half (i.e., 50%) of a maximum amount of power to be outputted from the motor-generator 10 (i.e., the sum of power to drive the vehicle and maximum power to drive the air conditioner 40), the system of this embodiment is capable of increasing the amount of power to be outputted to drive the vehicle, as demonstrated in FIG. 6(b). Such an increasing of the power is usually required to enhance the drivability of the vehicle during running thereof. The increase in size of the motor-generator 10 in order to meet such a demand leads to great concern about an increase in production cost thereof. In contrast, the structure of the hybrid system of this embodiment is designed to restrict the energy or power required to drive the compressor 42 in order to ensure the ability to accelerate the vehicle without having to increase the size of the motor-generator 10, which results in improvement on the drivability of the vehicle.

The hybrid system of this embodiment also ensures the operation of the compressor 42 without having to use an additional electric motor in driving the compressor 42 when the vehicle is stopped, and the engine 12 is stopped and especially enables the motor-generator 10 to be kept running to drive the compressor 42 with an increased efficiency when the vehicle is at rest. This is achieved by the structure which ensures the torque required to start the vehicle without having to increase the size of the motor-generator 10. In other words, the structure of the hybrid system eliminates the need for increasing the size of the motor-generator 10. This means that a maximum amount of power required to be outputted from the motor-generator 10 to the compressor 42 (i.e. the air conditioner 40), as illustrated in FIG. 6(a), may be set to occupy almost half (i.e., 50%) of a maximum amount of power to be outputted from the motor-generator 10 (i.e., the sum of power to drive the vehicle and maximum power to drive the air conditioner 40). The efficiency of the motor-generator 10 usually decreases as the output therefrom decreases in a range of a lower output to a high output which is smaller than a maximum output of the generator-motor 10. The maximum amount of power required to be supplied to the compressor 42, as described above, occupies much of the maximum amount of power to be outputted from the motor-generator 10. Therefore, the efficiency of the motor-generator 10 is enabled to be kept high when the motor-generator 10 is run only for driving the compressor 42. A maximum output of motor-generators such as ones mounted in conventional hybrid vehicles is usually 50 kW or more which is ten or more than dozen times a maximum required output of the compressor 42 (e.g., several kW). This causes the motor-generator 10 to be run to drive the compressor 42 with a low efficiency when the vehicle is at a stop.

The structure of the hybrid system (i.e., the power transmission device) of this embodiment offers the following advantages.

1) The power transmission device is designed to have the carrier C of the first planetary gear set 22 of the power split device 20 coupled mechanically to the driven shaft 42a of the compressor 42, thereby enabling the speed of the driven shaft 42a of the compressor 42 to be brought to zero or more when the vehicle is running.

2) The power split device 20 is equipped with the six rotors which are designed to have speeds thereof lying on the straight line in the nomographic chart and has two of the rotors which are different in speeds and connected mechanically to the motor-generator 10, thereby enabling all the speeds in nomographic chart to be controlled by the speed of the motor-generator 10.

3) Of the two of the rotors of the second planetary gear set 24, as described above, which have the speeds different from each other in the nomographic chart, respectively, one is joined mechanically with the motor-generator 10 through the CVT 36, thereby enabling the two of the rotors to be controlled in speed independently from each other like the case where two motor-generators are used in connection with the two of the rotors, respectively. In the case of use of such two motor-generators, this structure may also eliminate the loss of electric energy, as produced by one of the motor-generators which is operating as a generator, when the electric energy is supplied to the other motor-generator operating as an electric motor.

4) The carrier C of the first planetary gear set 22 joined mechanically to the driven shaft 42a of the compressor 42 is implemented by one of the rotors of the power split device 20 which has the speed in the nomographic chart, as illustrated in FIG. 23(b), between the speeds of the rotors of the power split device 20 which are connected to the motor-generator 10. This facilitates the ease of bringing the speed of the driven shaft 42a of the compressor 42 to zero or a value other than zero even when the speed of the motor-generator 10 is not zero (0).

5) The power transmission device is equipped with a first power transmission control mechanism (i.e., the clutch 30 and the one-way bearing 32) working to establish or block transmission of power between the engine starting rotor of the power split device 20 (i.e., the carrier C of the first planetary gear set 22) and the rotating shaft 12a of the engine 12 and a second power transmission control mechanism (i.e., the one-way bearing 34) working to establish or block transmission of power between the power transmission rotors of the power split device 20 (i.e., the sun gears S of the first and second planetary gear sets 22 and 24) and the rotating shaft 12a of the engine 12. Specifically, the power transmission device works to start the engine 12 and bring the speed thereof quickly to within an effective speed range and ensures the stability of transmitting the power to the vehicle in the effective speed range.

6) The engine starting rotor (i.e., the carrier C of the first planetary gear set 22) is used as a power source for the compressor 42, thereby facilitating the ease of brining the speed of the driven shaft 42a of the compressor 42 to zero or a value other than zero.

7) The power split device 20 is designed to joint two of the three rotors (i.e., the sun gear, the carrier, and the ring gear) of the first planetary gear set 22 mechanically to two of the three rotors (i.e., the sun gear, the carrier, and the ring gear) of the second planetary gear set 24, respectively, thereby enabling four groups of the rotors of the power split device 20 to be arrayed in speed on the straight line in the nomographic chart, as illustrated in FIG. 2(b).

8) When a required output of the motor-generator 10 is the threshold value Pth or more, the controller 50 restricts the amount of energy to be consumed by the compressor 42. This meets a requirement to run the vehicle while the maximum output of the motor-generator 10 is controlled.

Figure 27:
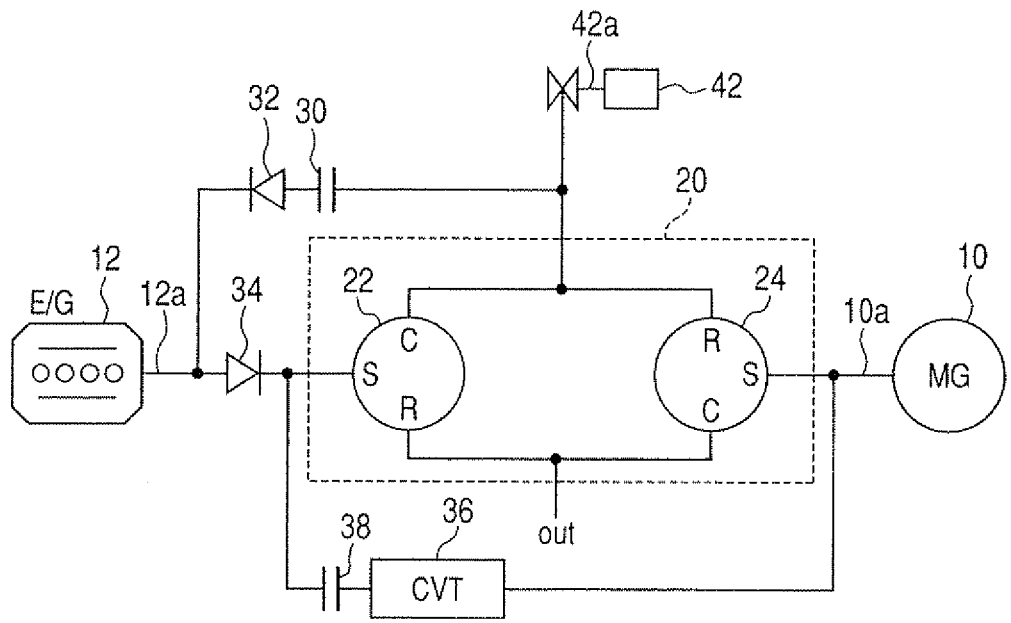
FIG. 27 is a block diagram which illustrates a power transmission device according to the fifteenth embodiment of the invention.

FIG. 27 illustrates a hybrid system according to the fifteenth embodiment of the invention. The same reference numbers as employed in FIGS. 22(a) and 22(b) refer to the same parts, and explanation thereof in detail will be omitted here.

The power split device 20 has the first planetary gear set 22 connected mechanically at the carrier C thereof to the ring gear R of the second planetary gear set 24. The carrier C and the ring gear R work as engine starting rotors of the power split device 20 to provide the initial torque (i.e., starting torque) to the engine 12. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 27. Like in FIG. 12, the path connected mechanically to the driven wheels 14 is expressed by "out". The sun gear S of the first planetary gear set 22 is used as the rotor which is connected to the power transmission axis and to which the torque, as produced by the engine 12, is transmitted. The sun gear S of the first planetary gear set 22 is also connected mechanically to the motor-generator 10 through the CVT 36. The motor-generator 10 is also connected mechanically to the sun gear S of the second planetary gear set 24.

The driven shaft 42a of the compressor 42 is coupled mechanically to the carrier C of the first planetary gear set 22 and the ring gear R of the second planetary gear set 24.

The structure of the hybrid system of this embodiment provides substantially the same advantages as described in the fourteenth embodiment.

Figure 28:
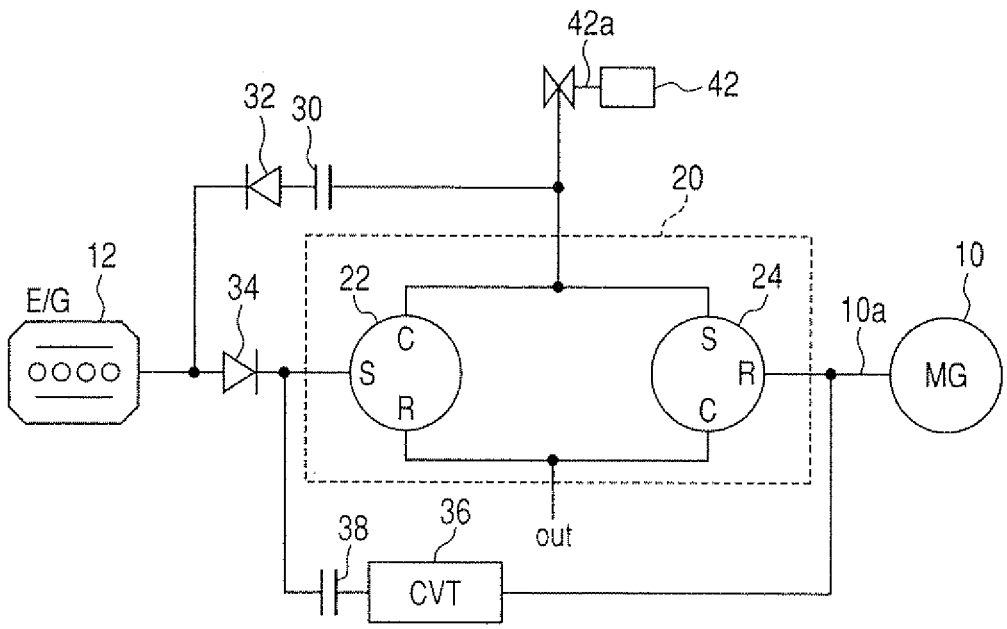
FIG. 28 is a block diagram which illustrates a power transmission device according to the sixteenth embodiment of the invention.

FIG. 28 illustrates a hybrid system according to the sixteenth embodiment of the invention. The same reference numbers as employed in FIGS. 22(a) and 22(b) refer to the same parts, and explanation thereof in detail will be omitted here.

The power split device 20 has the first planetary gear set 22 connected mechanically at the carrier C thereof to the sun gear S of the second planetary gear set 24. The carrier C and the sun gear S work as engine starting rotors of the power split device 20 to provide the initial torque to the engine 12. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 28. Like in FIG. 12, the path connected mechanically to the driven wheels 14 is expressed by "out". The sun gear S of the first planetary gear set 22 is used as the rotor which is connected to the power transmission axis and to which the torque, as produced by the engine 12, is transmitted. The sun gear S of the first planetary gear set 22 is also connected mechanically to the motor-generator 10 through the CVT 36. The motor-generator 10 is also connected mechanically to the ring gear R of the second planetary gear set 24.

The driven shaft 42a of the compressor 42 is coupled mechanically to the carrier C of the first planetary gear set 22 and the sun gear S of the second planetary gear set 24.

The structure of the hybrid system of this embodiment provides substantially the same advantages as described in the fourteenth embodiment.

Figure 29:
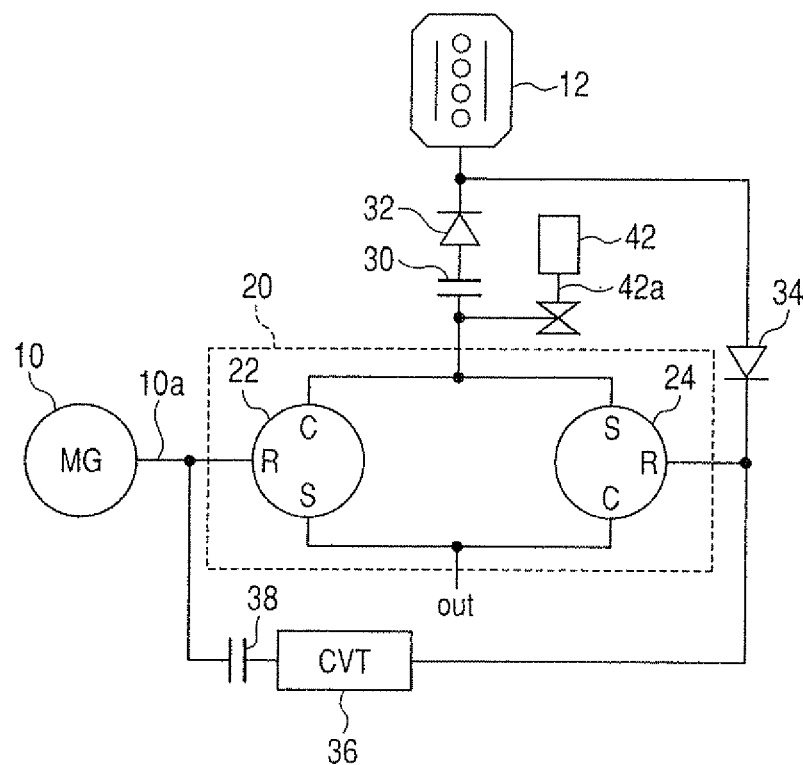
FIG. 29 is a block diagram which illustrates a power transmission device according to the seventeenth embodiment of the invention.

FIG. 29 illustrate a hybrid system according to the seventeenth embodiment of the invention. The same reference numbers as employed in FIGS. 22(a) and 22(b) refer to the same parts, and explanation thereof in detail will be omitted here.

The power split device 20 has the first planetary gear set 22 connected mechanically at the carrier C thereof to the sun gear S of the second planetary gear set 24. The carrier C and the sun gear S work as engine starting rotors of the power split device 20 to provide the initial torque to the engine 12. The sun gear S of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 29. Like in FIG. 12, the path connected mechanically to the driven wheels 14 is expressed by "out". The ring gear R of the second planetary gear set 24 is used as the rotor which is connected to the power transmission axis to which the torque, as produced by the engine 12, is transmitted. The ring gear R of the second planetary gear set 24 is also connected mechanically to the motor-generator 10 through the CVT 36. The motor-generator 10 is also connected mechanically at the rotating shaft 10a thereof to the ring gear R of the first planetary gear set 22.

The driven shaft 42a of the compressor 42 is coupled mechanically to the carrier C of the first planetary gear set 22 and the sun gear S of the second planetary gear set 24.

The structure of the hybrid system of this embodiment provides substantially the same advantages as described in the fourteenth embodiment.

Figure 30:
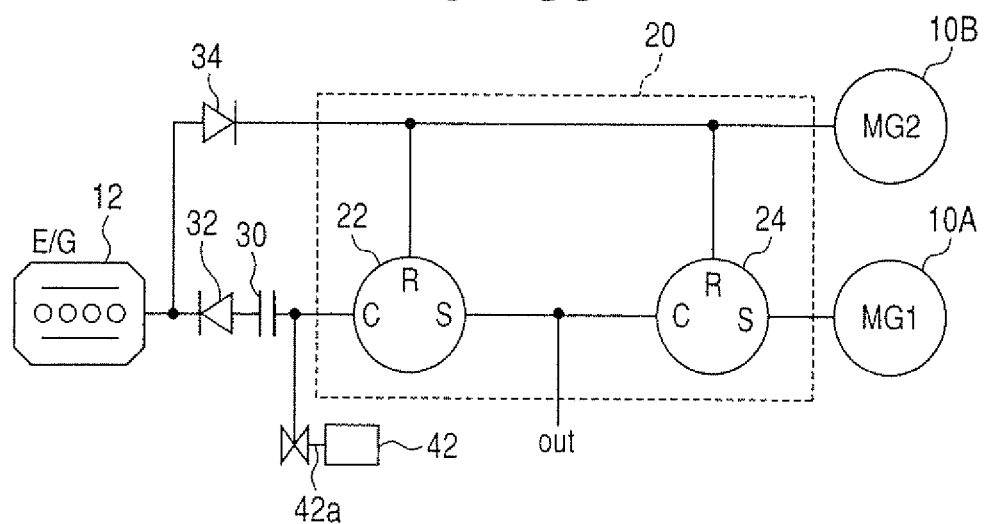
FIG. 30 is a block diagram which illustrates a power transmission device according to the eighteenth embodiment of the invention.

FIG. 30 illustrates a hybrid system according to the eighteenth embodiment of the invention. The same reference numbers as employed in FIGS. 22(a) and 22(b) refer to the same parts, and explanation thereof in detail will be omitted here.

The hybrid system, as can be seen from the drawing, does not have the CVT 36, but is equipped with two drive generator-motors 10A and 10B to drive the vehicle.

The power split device 20 has the first planetary gear set 22 connected mechanically at the ring gear R thereof to the ring gear R of the second planetary gear set 24. The ring gears R of the first and second planetary gear sets 22 and 24 are also connected mechanically to the second motor-generator 10B and work as rotors of the power split device 20 to which the torque, as produced by the engine 12, is transmitted through the one-way bearing 34. The sun gear S of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 30. Like in FIG. 12, the path connected mechanically to the driven wheels 14 is expressed by "out". The sun gear S of the second planetary gear set 24 is coupled mechanically to the first motor-generator 10A. The carrier C of the first planetary gear set 22 works as an engine starting rotor of the power split device 20 to provide the initial torque to the engine 12 through the clutch 30 and the one-way bearing 32.

The driven shaft 42a of the compressor 42 is coupled mechanically to the carrier C of the second planetary gear set 24.

The structure of this embodiment is operable to supply the torque of either of the first motor-generator 10A or the second motor-generator 10B to the compressor 42. Both the motor-generators 10A and 10B do not always necessarily function as a motor-generator. At least either of them may work as the motor-generator. For example, in the case where the first motor-generator 10A is designed to operate as only a generator, the electric energy, as produced by the first motor-generator 10A, is consumed by the second motor-generator 10B working as an electric motor to drive the vehicle. The first motor-generator 10A working as only the generator is used to provide a braking effort when it is required to brake the vehicle and also to control the speeds of the rotors of the power split device 20.

The structure of the hybrid system of this embodiment provides substantially the same advantages (1), (2), and (4) to (8) as in the fourteenth embodiment.

Figure 31:
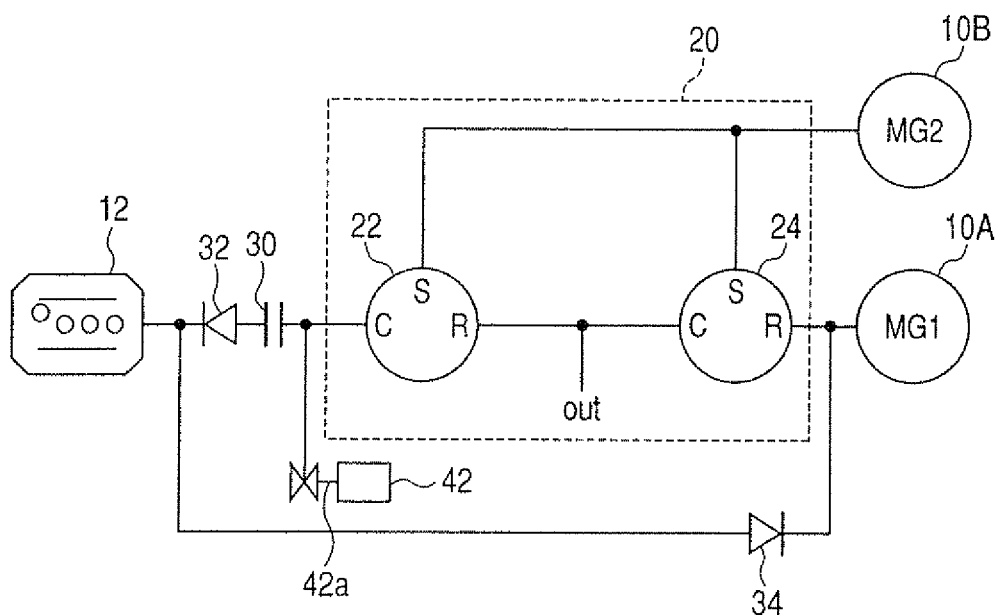
FIG. 31 is a block diagram which illustrates a power transmission device according to the nineteenth embodiment of the invention.

FIG. 31 illustrates a hybrid system according to the nineteenth embodiment of the invention. The same reference numbers as employed in FIGS. 22(a) and 22(b) refer to the same parts, and explanation thereof in detail will be omitted here.

The hybrid system, like in the eighteenth embodiment, does not have the CVT 36, but is equipped with two drive generator-motors 10A and 10B to drive the vehicle.

The power split device 20 has the first planetary gear set 22 connected mechanically at the sun gear S thereof to the sun gear S of the second planetary gear set 24. The sun gears S of the first and second planetary gear sets 22 and 24 are also connected mechanically to the second motor-generator 10B. The ring gear R of the first planetary gear set 22 is coupled mechanically to the carrier C of the second planetary gear set 24, which are in turn connected mechanically to the driven wheels 14. For the sake of simplicity of illustration, the driven wheels 14 are omitted from FIG. 31. Like in FIG. 12, the path connected mechanically to the driven wheels 14 is expressed by "out". The ring gear R of the second planetary gear set 24 is coupled mechanically to the first motor-generator 10A and works as the rotor of the power split device 20 to which the torque of the engine 12 is transmitted through the one-way bearing 34. The carrier C of the first planetary gear set 22 works as the engine starting rotor to provide the initial torque to the engine 12.

The driven shaft 42a of the compressor 42 is coupled mechanically to the carrier C of the first planetary gear set 22.

The structure of the hybrid system of this embodiment provides substantially the same advantages (1), (2), and (4) to (8) as in the fourteenth embodiment.

Figure 32:
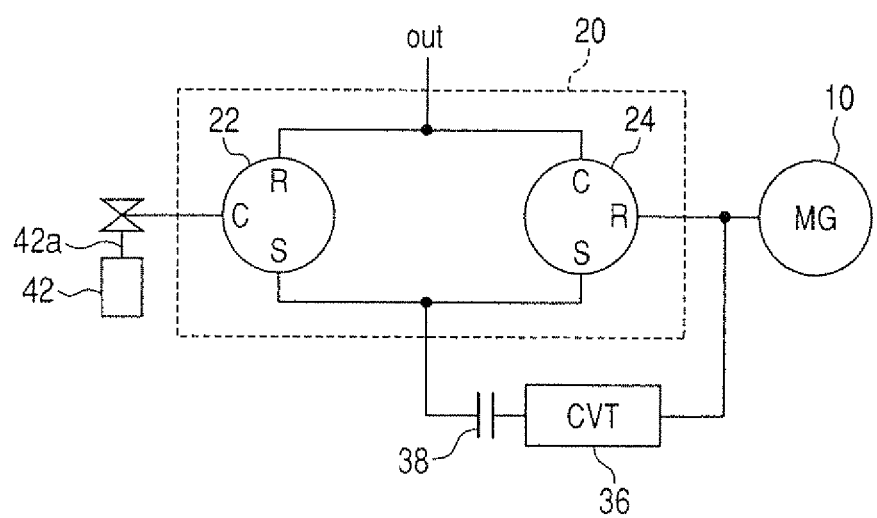
FIG. 32 is a block diagram which illustrates a power transmission device according to the twentieth embodiment of the invention.

FIG. 32 illustrates a power transmission device according to the twentieth embodiment of the invention. The power transmission device of this embodiment is installed in a so-called electric vehicle which does not have the internal combustion engine 12 and is equipped only with the generator-motor 10. The same reference numbers as employed in FIGS. 22(a) and 22(b) refer to the same parts, and explanation thereof in detail will be omitted here.

As can be seen from the drawing, the power split device 20 is identical in structure with the one in the fourteenth embodiment. The compressor 42 is connected to the motor-generator 10 in the same manner as in the fourteenth embodiment.

Figure 33:
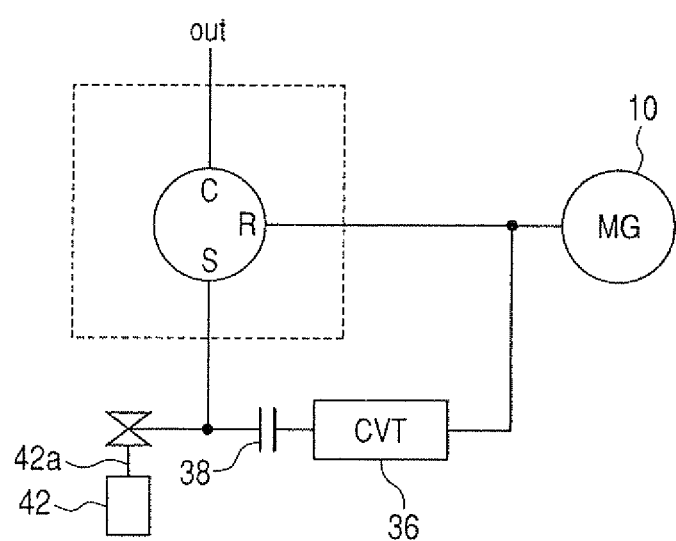
FIG. 33 is a block diagram which illustrates a power transmission device according to the twenty-first embodiment of the invention.

FIG. 33 illustrates a power transmission device according to the twenty-first embodiment of the invention. The power transmission device of this embodiment is, like in the twentieth embodiment, installed in a so-called electric vehicle which does not have the internal combustion engine 12 and is equipped only with the generator-motor 10. The same reference numbers as employed in FIGS. 22(a) and 22(b) refer to the same parts, and explanation thereof in detail will be omitted here.

As can be seen from the drawing, the power split device 20 is equipped with a single planetary gear set which is connected at a carrier C thereof to the driven wheels 14. For the sake of simplicity of illustration, the driven wheels 14 are omitted from FIG. 33. Like in FIG. 12, the path connected mechanically to the driven wheels 14 is expressed by "out". The ring gear R and the sun gear S of the planetary gear set are connected mechanically to the motor-generator 10. The CVT 36 and the clutch 38 are disposed between the sun gear S and the motor-generator 10.

The driven shaft 42a of the compressor 42 is connected mechanically to the sun gear S of the planetary gear set. The torque of the ring gear R or the sun gear S is transmitted to the driven shaft 42a of the compressor 42.

The speeds of two of the three rotors of the planetary gear set are permitted to be changed selectively. For example, the speed of the carrier C may be determined depending upon a requirement to drive the vehicle, while the speed of the sun gear S may be determined depending upon a requirement to drive the compressor 42. In this case, the speed of the ring gear R depends upon those of the sun gear S and the carrier C, as in the nomographic chart. Therefore, the speeds of the ring gear R and the sun gear S which are required in the above embodiments may be achieved by regulating the gear ratio CVT 36 and the speed of the motor-generator 10.

The above fourteenth to twenty-first embodiments may be modified as discussed below.

The rotor(s) of the power split device 20 which is connected mechanically to the compressor 42 mounted in the vehicle is not limited to that as described above. Basically, the rotor(s) of the power split device 20 which is permitted to have a speed of zero (0) or not zero (0) selectively when the vehicle is running may be used.

In the fourteenth to nineteenth embodiments, the CVT 36 is exchanged in location with the clutch 38. For example, in the fourteenth embodiment, the clutch 38 may be disposed closer to the rotating shaft 10a of the motor-generator 10 than the CVT 36, while the CVT 36 may be disposed closer to the sun gears S of the first and second planetary gear sets 22 and 24.

In the fourteenth to nineteenth embodiments, the clutch 30 is disposed closer to the starting axis of the power split device 20, while the one-way bearing 32 is disposed closer to the rotating shaft 12a of the engine 12, but they may be disposed vice versa. Further, clutches may also be disposed on both sides of the one-way bearing 32.

In the fourteenth to nineteenth embodiments, the clutch 30 is disposed to block the path through which the torque is transmitted from the power split device 20 to the rotating shaft 12a of the engine 12 when it is required to start the engine 12, but however, it may be omitted. This structure also enables the speed of the driven shaft 42a of the compressor 42 to be brought to zero (0) or a value other than zero (0) when the vehicle is running.

The one-way bearing 32 is disposed between the power split device 20 and the engine 12 to establish the transmission of power to the engine 12 from the power split device 20 when the speed of the starting axis of the power split device 20 (i.e., a power input side of the one-way bearing 32) is greater than or equal to that of the rotating shaft 12a of the engine 12 (i.e., a power output side of the one-way bearing 32), however, a one-way clutch or another similar type working to have the rotating shaft 12a follow the rotation of the starting axis of the power split device 20 with or without slip may be used.

The one-way bearing 32 working to establish the transmission of torque from the starting axis of the power split device 20 to the rotating shaft 12a of the engine 12 under the condition that the speed of the starting axis of the power split device 20 relative to the rotating shaft 12a of the engine 12 is not zero (0) may be omitted. For example, only the clutch 30 may be disposed between the rotating shaft 12a and the starting axis of the power split device 20. After the engine 12 is started up, the controller 50 disengages the clutch 30 to block the connection between the engine 12 and the power split device 20, thereby establishing only the mechanical connection between the rotors (e.g., the sun gears S in FIGS. 22(a) and 22(b)) of the power split device 20 which are higher in speed than the starting axis (e.g., the carrier C of the first planetary gear set 22 in FIGS. 22(a) and 22(b)) of the power split device 20 and the engine 12.

The one-way bearing 34 is disposed between the power split device 20 and the engine 12 to establish the transmission of power from the engine 12 to the power transmission axis of the power split device 20 under the condition that the speed of the rotating shaft 12a of the engine 12 (i.e., a power input side of the one-way bearing 34) is greater than or equal to that of the power transmission axis of the power split device 20 (i.e., a power output side of the one-way bearing 334), however a one-way clutch or another similar type working to have the power transmission axis follow the rotation of the rotating shaft 12a of the engine 12 with or without slip may be used.

The one-way bearing 34 may be replaced with a clutch similar in structure to the clutch 30. In this case, the controller 50 engages the clutch when the speed of the engine 12 is equal to that of the power transmission axis of the power split device 20 to ensure the stability in connecting the rotating shaft 12a of the engine 12 and the power transmission axis.

The power transmission axis of the power split device 20 in the fourteenth embodiment is the shaft connecting with the sun gears S of the first and second planetary gear sets 22 and 24, however, may alternatively be the shaft connecting with the ring gear R of the second planetary gear set 24. Similarly, in the fifteenth to nineteenth embodiments, the power transmission axis may be the shaft connecting mechanically with the rotating shaft 10a of the motor-generator 10. Further, in the fourteenth to nineteenth embodiments, the power transmission axis may be joined to the rotating shaft 10a of the motor-generator 10 without use of the CVT 36. Specifically, in FIGS. 22(a) and 22(b), a shaft which rotates together with the sun gears S of the first and second planetary gear sets 22 and 24 and the rotating shaft 10a of the motor-generator 10 may be implemented by a single shaft. Alternatively, the motor-generator 10 may also be connected mechanically to one of shafts of the CVT 36 which is closer to the clutch 38.

In the fourteenth embodiment, the engine 12 may alternatively be used to start the vehicle instead of the motor-generator 10.

The first and second planetary gear sets 22 and 24 of the power split device 20 may alternatively be designed to have structures different from those described in the above embodiments. The first and second planetary gear sets 22 and 24 is preferably so designed that any two of the three rotors (i.e., the sun gear S, the carrier C, and the ring gear R) of the first planetary gear set 22 are coupled mechanically to any two of the three rotors (i.e., the sun gear S, the carrier C, and the ring gear R) of the second planetary gear set 24. As already described prior to the fourteenth embodiment, the first and second planetary gear sets 22 and 24 may be modified, as demonstrated the nomographic charts in FIGS. 20(a) to 20(j) and FIGS. 21(a) to 21(j). Each of the nomographic charts represents the relation in connection between a total of six rotors of the first and second planetary gear sets 22 and 24 and the relation between four different speeds arraying straight in the nomographic chart and the six rotors of the first and second planetary gear sets 22 and 24. Note that the ratio of the number of teeth of the run gear S to that of the ring gear R is, however, indicated schematically for the sake of convenience.

In each of the nomographic charts, the sun gear S, the carrier C, and the ring gear R of the first planetary gear set 22 are illustrated on the upper side. For example, in FIGS. 20(b) and 20(c), the ring gears R of the first and second planetary gear sets 22 and 24 are connected mechanically to each other. The carriers C of the first and second planetary gear sets 22 and 14 are connected mechanically to each other. Which of the ratio of the number of teeth of the run gear S to that of the ring gear R of the first planetary gear set 22 and that of the second planetary gear set 24 is greater is represented by lateral locations of vertical lines indicating the sun gears S. The same advantages, as described in the fourteenth embodiment, may be obtained by connecting the motor-generator 10 to the rotor of the power split device 20 which lies in speed at the right or left end in the nomographic chart, and connecting the rotors having intermediate speeds to the starting axis for the engine 12 and the driven wheels 14, respectively from the left in the nomographic chart.

The first and second planetary gear sets 22 and 24 of the power split device 20 may alternatively be designed not to have the structure in which any two of the three rotors of the first planetary gear set 22 are coupled mechanically to any two of the three rotors of the second planetary gear set 24. For instance, each of the three rotors of the first planetary gear set 22 may be coupled mechanically to one of the three rotors of the second planetary gear set 24. In this case, the supply of power to the accessory and the driven wheels 14 may be achieved by connecting the driven wheels 14 to one of pairs of the coupled rotors of the first and second planetary gear sets 22 and 24 and also connecting the other four rotors to the engine 12 and the motor-generator 10, respectively. Specifically, the engine 12 is joined mechanically to one of the four other rotors. The motor-generator 10 is joined mechanically directly to one of the three other rotors and also joined to one of the two other rotors through the CVT 36. Alternatively, some of the six rotors of the first and second planetary gear sets 22 and 24 may be fixed. In this case, the speeds of the rotors in the nomographic chart do not lie on the straight line, but they are defined by two lines intersecting with each other at a single point.

The power split device 20 to be installed in the hybrid vehicle may alternatively be designed to have a single planetary gear set, that is, either of the first and second planetary gear sets 22 and 24. For instance, the power split device 20 may be equipped with a single planetary gear set and two motor-generators: first and second motor-generators. The first motor-generator is connected mechanically to the sun gear of the planetary gear set. The second motor-generator is connected mechanically to the ring gear of the planetary gear set. The carrier of the planetary gear set is connected mechanically to the starting axis. The ring gear is connected to the transmission axis. In this case, the carrier is connected to the accessory (i.e., the compressor 42). This enables the driven shaft of the accessory to be brought to zero (0) or a value other than zero (0) when the vehicle is running. The clutch 30 is preferably used to block the mechanical connection between the engine 12 and the carrier of the planetary gear set.

The power split device 20 made up of the planetary gear sets 22 and 24 each of which includes three rotors: the run gear S, the carrier C, and the ring gear R may also be designed to have the structure, as taught in the first to third publications already referred to in the introductory part of this application.

A switch or selector may be used to select one(s) of the rotors of the power split device 20 which is to be connected mechanically to the driven wheels 14. In this case, the power transmission device is designed to have at least one of the rotors of the power split device 20 which transmits the torque to the compressor 42, thereby enabling the speed of the compressor 42 to be set to zero (0) or any value other than zero (0) when the vehicle is running.

The compressor 42 may alternatively be of a type designed to discharge a fixed amount of fluid.

A power transmission control mechanism such as the clutch 30 or any other similar type clutch may be used which establishes or blocks the mechanical connection between the rotor(s) of the power split device 20 and the compressor 42. A one-way transmission mechanism such as a one-way clutch may also or alone be used to establish the transmission of power to the compressor 42 under the condition that the speed of the rotor(s) of the power split device 20 is not smaller than that of the driven shaft 42a of the compressor 42.

The in-vehicle accessory is not limited to the one, as referred to in the above embodiments. For instance, a fuel pump for the engine 12, an oil pump which supplies lubricant oil to the transmission, a water pump which circulates cooling water to cool the engine 12, an air charging device which pressurizes and charges fresh air into a combustion chamber of the engine 12, or an air pump which supplies air to an exhaust pipe of the engine 12 may be selected as the accessory required to be driven by the power split device 20. One or a plurality of accessories may be coupled mechanically to one of the rotors of the power split device 20. Alternatively, the power split device 20 may also be designed to have the three rotors each of which is coupled to one of the three or more accessories. If the accessory, such as the air pump which may not be required to be driven when the vehicle is running, is used, it is particularly effective that one(s) of the rotors of the power split device 20 which may be brought in speed to zero (0) or any value other than zero (0) when the vehicle is running is used as a power source for the accessory.

In the fourteenth to seventeenth, twenty, and twenty-first embodiments, a maximum energy required by the accessory is 50% of a maximum required output of the motor-generator 10, but it may be set to another percentage. It is, however, advisable that a maximum value of output of the motor-generator 10 required by the accessory (in the case where there are a plurality of accessories to be driven by the power split device 20, a maximum value of the sum of outputs of the motor-generator 10 required by all the accessories) be not much smaller than the maximum output of the motor-generator 10. Therefore, the maximum energy required by the motor-generator 10 is preferably 25% or more, more preferably 35% or more of the maximum required output of the motor-generator 10.

The above percentage is also desirable in the eighteenth and nineteenth embodiments. Therefore, in the eighteenth or nineteenth embodiment, a CVT may be disposed between the first motor-generator 10A or the second motor-generator 10B and the power split device 20 or between the power split device 20 and the driven wheels 14 to permit the gear ratio thereof required to start the vehicle to be selected to be a very low speed value. This enables the torque which can be applied to the driven wheels 14 to be increased without having to increase the size of the first motor-generator 10A or the second motor-generator 1013.

The CVT 36 disposed between the motor-generator 10 and the rotors of the power split device 20 which lie in speed thereof straight in the nomographic chart needs not be of a belt-type. For example, a traction drive type or hydraulic continuously variable transmission may be used. Alternatively, a gear transmission may be used instead of the CVT 36. These types of transmission needs not always be disposed between the motor-generator 10 and the rotors of the power split device 20 which lie at one of ends in the nomographic chart defining the speeds of the rotors of the power split device 20.

The mechanical connections of the driven wheels 14, the engine 12, the motor-generator 10 to the power split device 20 may alternatively be achieved in some way different from those as described above. For instance, a speed reducer such as a speed reduction gear set or a counter gear may be disposed between the power spilt device 20 and the driven wheels 14. The use of the counter gear depending upon specifications of the engine 12 such as the direction of rotation thereof will ensure the desired distribution of power to the driven wheels 14. The mechanical connection of the driven wheels 14 to the power split device 20 may also be achieved using a chain or a belt instead of a rigid gear mechanism.

Similarly, a counter gear may also be disposed between the engine 12 and the power transmission axis or the starting axis of the power split device 20. A speed increasing mechanism such as a speed increasing gear set or a speed reducer such as a speed reduction gear set may also be disposed in a mechanical connection between the motor-generator 10 and the power split device 20. Further, the mechanical connection between the engine 12 and the power split device 20 may be achieved by a chain or a belt as well as a rigid gear(s).

The speed increasing mechanism or the speed reducer may also be disposed in the mechanical connection between the motor-generator 10 and the power split device 20 without through the CVT 36. The mechanical connection of the motor-generator 10 to the sun gears S through the CVT 36 and to the ring gear R is not limited to the one, as illustrated in FIG. 22(b), in which the counter gear CN is disposed in a joint between the motor generator 10 and the ring gear R of the second planetary gear set 24 without through the CVT 36. For instance, a rotary reversing mechanism such as a counter gear may also be disposed between the CVT 36 and the sun gears S of the first and second planetary gear sets 22 and 24. This is achieved under the condition that the speed of the carrier C can be zero (0) when the speeds of the sun gear S and the ring gear R are opposite in sign to each other, however, may also be achieved under the condition that the speed of the carrier C can be zero (0) when the speeds of the sun gear S and the ring gear R are the same in sign. For example, it may be realized by using a so-called double planetary gear set, as taught in Japanese Patent First Publication No. 2001-108073. The mechanical connection of the motor-generator 10 to the power split device 20 without the CVT 36 may also be achieved using a chain or a belt as well as a rigid gear mechanism.

The power transmission device in the above embodiments may be equipped with three or more generator-motors. In this case, the one or more motor-generators may be used only as an electric motor or an electric generator.

The electric rotating machine may alternatively be implemented by a DC motor with brushes, a brushless DC motor, or an induction motor instead of the three-phase AC motor. In this case, a power converter which supplies the power to the electric rotating machine needs be changed. In the case of use of the DC motor with brushes, it is preferably installed externally on the outer wall of an oil-filled casing of the power spit device 20. This is because contacts of the DC motor with brushes may fail to make an electric connection due to the oil. In the case of use of a brushless DC motor, it is preferably installed in the casing of the power split device 20. This is because the motor is cooled by the oil. In the case where the CVT 36 of a wet type is used in the fourteenth to nineteenth embodiments, the CVT 36 is preferably installed in the casing. Therefore, in the case where the motor-generator 10 is disposed outside the casing, the rotating shaft 10a is, as illustrated in FIG. 22(b), joined preferably to the counter gear CN. The motor-generator 10 may alternatively be installed inside the casing and joined at the rotating shaft 10a to the counter gear CN. For instance, in FIGS. 22(a) and 22(b), the driven shaft 42a of the compressor 42 may be disposed between the engine starting axis which rotates together with the sun gears S of the first and second planetary gear sets 22 and 24 and the one-way bearing 34. This will, however, face a difficulty in mounting the compressor 42 out of the casing when the one-way bearing 34 is installed in the casing. It is, therefore, preferable that the driven shaft 42a of the compressor 42 is disposed the engine starting axis which rotates together with the sun gears S of the first and second planetary gear sets 22 and 24 and the clutch 38, and the clutch 38 and the CVT 36 are implemented as a dry type. This permits the compressor 42 to be installed out of the casing.

The hybrid system in each of the fourteenth to nineteenth embodiments may alternatively be designed to have two or more internal combustion engines.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A power transmission apparatus for a vehicle comprising:
   an electric rotating machine which produces power; and
   a power transmission mechanism including three or more power split rotors which work to rotate in conjunction with each other to split the power as torque between a driven wheel of a vehicle and an auxiliary machine mounted in the vehicle,
   wherein a first rotor that is one of the power split rotors of said power transmission mechanism is coupled mechanically to the driven wheel of the vehicle, and a second rotor that is another of the power split rotors provides the torque to the auxiliary machine,
   wherein the power transmission mechanism is so designed that when a speed of the first rotor is zero (0), a speed of the second rotor has a value other than zero (0),
   wherein when the speed of the first rotor is zero (0), the speed of the second rotor is controllable by controlling a rotational speed of said electric rotating machine,
   wherein at least two of the power split rotors are connected mechanically to said electric rotating machine,
   wherein said power transmission mechanism includes a first planetary gear set and a second planetary gear set each of which is equipped with three rotors: a sun gear, a carrier, and a ring gear that are three of said power split rotors, two of said power split rotors of the first planetary gear set being coupled mechanically to two of said power split rotors of the second planetary gear set, and
   wherein four of the six rotors of the first and second planetary gear sets each rotate at different speeds relative to each other to split the power from the electric rotating machine between the driven wheel and the auxiliary machine.

2. A power transmission apparatus as set forth in claim 1, wherein said electric rotating machine is connected mechanically to one of the power split rotors which is other than the first rotor.

3. A power transmission apparatus as set forth in claim 1, wherein one of the at least two of the power split rotors is coupled to said electric rotating machine through a speed variator having a variable speed ratio.

4. A power transmission apparatus as set forth in claim 1, wherein the first rotor has a rotating speed between respective rotating speeds of the two power split rotors connected mechanically to said electric rotating machine.

5. A power transmission apparatus as set forth in claim 1, wherein said power split rotors also work to transmit power among the driven wheel of the vehicle, said electric rotating machine, and an internal combustion engine, and further comprising a breaker working to block transmission of the power between the internal combustion engine and the power split rotors when the internal combustion engine is at a stop.

6. A power transmission apparatus as set forth in claim 1, wherein when the speed of the first rotor is zero (0), the speed of the second rotor is controllable by stopping the driven wheel through a brake and regulating a rotational speed of said electric rotating machine.

7. A power transmission apparatus as set forth in claim 1, further comprising a switch which works to switch the first rotor coupled mechanically to the driven wheel to another of the power split rotors.

8. A power transmission apparatus as set forth in claim 1, wherein the auxiliary machine is an accessory mounted in the vehicle which is required to be driven when the vehicle is at a stop.

9. A power transmission apparatus as set forth in claim 8, wherein the auxiliary machine is a compressor for an air conditioner mounted in the vehicle.

10. A power transmission apparatus as set forth in claim 1, further comprising an electronically controlled breaker which works to transmit power between the second rotor and the auxiliary machine.

11. A power transmission apparatus for a vehicle comprising:
an electric rotating machine which produces power; and
a power transmission mechanism including three or more power split rotors which work to rotate in conjunction with each other to split the power as torque between a driven wheel of a vehicle and an auxiliary machine mounted in the vehicle,
wherein a first rotor that is one of the power split rotors of said power transmission mechanism is coupled mechanically to the driven wheel of the vehicle, and a second rotor that is another of the power split rotors provides torque to the auxiliary machine, and
wherein the power transmission mechanism is so designed that when a speed of the first rotor is not zero (0), a speed of the second rotor has one of zero (0) and a value other than zero (0),
wherein at least two of the power split rotors are connected mechanically to said electric rotating machine,
wherein said power transmission mechanism includes a first planetary gear set and a second planetary gear set each of which is equipped with three rotors: a sun gear, a carrier, and a ring gear that are three of said power split rotors, two of said power split rotors of the first planetary gear set being coupled mechanically to two of said power split rotors of the second planetary gear set, and
wherein four of the six rotors of the first and second planetary gear sets each rotate at different speeds relative to each other to split the power from the electric rotating machine between the driven wheel and the auxiliary machine.

12. A power transmission apparatus as set forth in claim 11, wherein one of the at least two of the power split rotors is coupled to said electric rotating machine through a speed variator having a variable speed ratio.

13. A power transmission apparatus as set forth in claim 11, wherein the second rotor has a rotating speed between respective rotating speeds of the two power split rotors connected mechanically to said electric rotating machine.

14. A power transmission apparatus as set forth in claim 11, wherein said power split rotors also work to power among the driven wheel of the vehicle, said electric rotating machine, and an internal combustion engine, wherein one of the three or more power split rotors is the second rotor, and at least two of the three of more power split rotors are connected mechanically to the electric rotating machine, and further comprising a first power transmission mechanism and a second power transmission mechanism, the first power transmission mechanism working to selectively establish and block transmission of power between a rotating shaft of the internal combustion engine and one of the power split rotors which is other than the first rotor and serves as an engine starting rotor, the second power transmission mechanism working to selectively establish and block transmission of power between the internal combustion engine and one of the power split rotors which is other than the engine starting rotor and serves as a power transmission rotor.

15. A power transmission apparatus as set forth in claim 14, wherein the engine starting rotor is the second rotor.

16. A power transmission apparatus as set forth in claim 11, wherein the auxiliary machine is an accessory mounted in the vehicle which is required to be driven when the vehicle is at a stop.

17. A power transmission apparatus as set forth in claim 16, wherein the auxiliary machine is a compressor for an air conditioner mounted in the vehicle.

\* \* \* \* \*